(12) United States Patent
Kennewick, Sr. et al.

(10) Patent No.: US 11,620,783 B2
(45) Date of Patent: Apr. 4, 2023

(54) 3D AVATAR GENERATION AND ROBOTIC LIMBS USING BIOMECHANICAL ANALYSIS

(71) Applicant: AI Thinktank LLC, Bellevue, WA (US)

(72) Inventors: Michael Rye Kennewick, Sr., Bellevue, WA (US); Samuel Menaker, Bellevue, WA (US); Rich Kennewick, Seattle, WA (US)

(73) Assignee: AI Thinktank LLC, Bellevue, WA (US)

( * ) Notice: Subject to any disclaimer, the term of this patent is extended or adjusted under 35 U.S.C. 154(b) by 0 days.

(21) Appl. No.: 17/827,044

(22) Filed: May 27, 2022

(65) Prior Publication Data

US 2022/0383578 A1 Dec. 1, 2022

Related U.S. Application Data

(60) Provisional application No. 63/193,697, filed on May 27, 2021.

(51) Int. Cl.
*G06T 13/40* (2011.01)
*G06T 19/00* (2011.01)
*G06V 40/20* (2022.01)
*G06T 7/20* (2017.01)

(52) U.S. Cl.
CPC ............... *G06T 13/40* (2013.01); *G06T 7/20* (2013.01); *G06T 19/00* (2013.01); *G06V 40/23* (2022.01); *G06T 2207/30196* (2013.01)

(58) Field of Classification Search
None
See application file for complete search history.

(56) References Cited

U.S. PATENT DOCUMENTS

| | | | |
|---|---|---|---|
| 5,148,477 | A | 9/1992 | Neely |
| 7,200,266 | B2 | 4/2007 | Ozer |
| 7,317,836 | B2 | 1/2008 | Fujimura |
| 8,189,866 | B1 | 5/2012 | Gu |

(Continued)

FOREIGN PATENT DOCUMENTS

| | | |
|---|---|---|
| CN | 104298353 | 1/2015 |
| EP | 2843621 | 3/2015 |

OTHER PUBLICATIONS

Wei et al., "Intuitive Interactive Human Character Posing with Millions of Example Poses" (Year: 2011).*

(Continued)

*Primary Examiner* — Hilina K Demeter
(74) *Attorney, Agent, or Firm* — Sheppard Mullin Richter & Hampton LLP

(57) ABSTRACT

Systems and methods are disclosed for generating a 3D avatar or instructions for movement of robotic limbs using a biomechanical analysis of observed actions with a focus on representing actions through computer-generated 3D avatars or instructions for movement of robotic limbs. Physical quantities of biomechanical actions can be measured from the observations, and the system can analyze these values, compare them to target or optimal values, and use the observations and known biomechanical capabilities to generate 3D avatars or instructions for movement of robotic limbs.

26 Claims, 18 Drawing Sheets

(56) References Cited

U.S. PATENT DOCUMENTS

| | | | |
|---|---|---|---|
| 8,979,665 B1* | 3/2015 | Najafi | G09B 19/0038 473/266 |
| 9,161,708 B2 | 10/2015 | Elliott | |
| 9,248,361 B1 | 2/2016 | Jones | |
| 9,589,207 B2 | 3/2017 | Holohan | |
| 9,656,121 B2 | 5/2017 | Rose | |
| 9,878,206 B2 | 1/2018 | Rowe | |
| 9,978,425 B2 | 5/2018 | Kirk | |
| 10,010,753 B2 | 7/2018 | Brothers | |
| 10,080,941 B2 | 9/2018 | Brekke | |
| 10,186,041 B2 | 1/2019 | Chang | |
| 10,271,773 B2 | 4/2019 | Chang | |
| 10,478,689 B2 | 11/2019 | Brekke | |
| 10,748,581 B2 | 8/2020 | Bose | |
| 10,755,466 B2* | 8/2020 | Chamdani | A63F 13/212 |
| 10,828,549 B2 | 11/2020 | Li | |
| 11,276,196 B2* | 3/2022 | Bickerstaff | G06T 13/80 |
| 11,348,255 B2 | 5/2022 | Tamir | |
| 11,373,354 B2 | 6/2022 | Tamir | |
| 11,426,099 B2 | 8/2022 | Barr | |
| 11,450,053 B1* | 9/2022 | Georgis | G06T 17/00 |
| 2003/0008731 A1 | 1/2003 | Anderson | |
| 2004/0131254 A1 | 7/2004 | Liang | |
| 2010/0121227 A1 | 5/2010 | Stirling | |
| 2011/0054870 A1 | 3/2011 | Dariush | |
| 2011/0182469 A1 | 7/2011 | Ji | |
| 2011/0276153 A1 | 11/2011 | Selner | |
| 2012/0070070 A1 | 3/2012 | Litvak | |
| 2014/0143183 A1 | 5/2014 | Sigal | |
| 2014/0257538 A1 | 9/2014 | Rose | |
| 2015/0363644 A1 | 12/2015 | Wnuk | |
| 2016/0256740 A1 | 9/2016 | Rowe | |
| 2017/0001072 A1 | 1/2017 | Brekke | |
| 2017/0228587 A1 | 8/2017 | Zhang | |
| 2017/0274256 A1 | 9/2017 | Brekke | |
| 2017/0316578 A1 | 11/2017 | Fua | |
| 2017/0365085 A1 | 12/2017 | Moll | |
| 2018/0357472 A1 | 12/2018 | Dreessen | |
| 2019/0043240 A1* | 2/2019 | Finegold | G06F 3/04883 |
| 2019/0046836 A1 | 2/2019 | Starkey | |
| 2019/0114690 A1 | 4/2019 | Paquette | |
| 2019/0130602 A1* | 5/2019 | Hall | G06V 10/82 |
| 2019/0224528 A1 | 7/2019 | Omid-Zohoor | |
| 2019/0362506 A1* | 11/2019 | Leroyer | G06F 18/2413 |
| 2020/0005544 A1* | 1/2020 | Kim | G06T 13/40 |
| 2020/0005670 A1* | 1/2020 | Iwao | G06T 13/40 |
| 2020/0047029 A1 | 2/2020 | Bentley | |
| 2020/0058137 A1* | 2/2020 | Pujades | G06V 40/23 |
| 2020/0273229 A1 | 8/2020 | Thielen | |
| 2020/0312037 A1 | 10/2020 | Kopeinigg | |
| 2021/0004981 A1 | 1/2021 | Song | |
| 2022/0036052 A1 | 2/2022 | Prince | |
| 2022/0241642 A1 | 8/2022 | Halevy | |
| 2022/0245836 A1 | 8/2022 | Halevy | |
| 2022/0266091 A1 | 8/2022 | Yuen | |

OTHER PUBLICATIONS

Ke, Shian-Ru, et al., "A Review on Video-Based Human Activity Recognition", Computers, vol. 2, doi: 10.3390/computers2020088, 2013, pp. 88-131.

"Xsens Extends Industrial Motion Tracking Products with New Rugged Modules for harsh Environments", retrieved from the Internet at <URL: https://www.xsens.com/press-releases/xsens-extends-industrial-motion-tracking-products-with-new-rugged-modules-for-harsh-environments>, May 20, 2021 (Year: 2021), retrieved from the Internet on Nov. 8, 2022, 3 pages.

Lemire, Joe, "Track160's New App Lets Players Share Video and Advanced Analysis, Creating New Fan Engagement Opportunities", SportTechie | Sports Business Journal, Jul. 27, 2022, 5 pages.

* cited by examiner

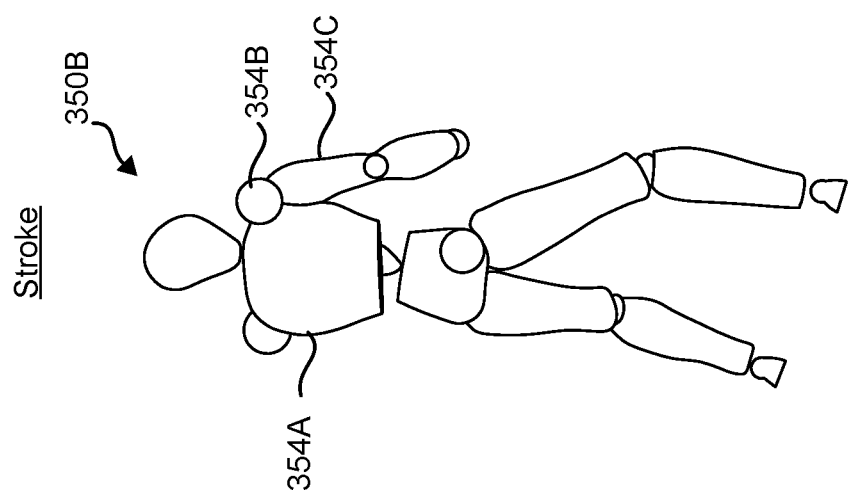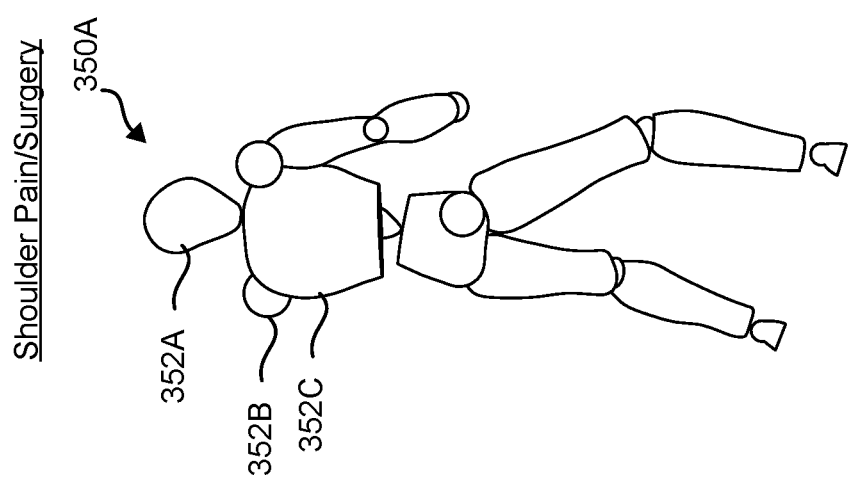
FIG. 3

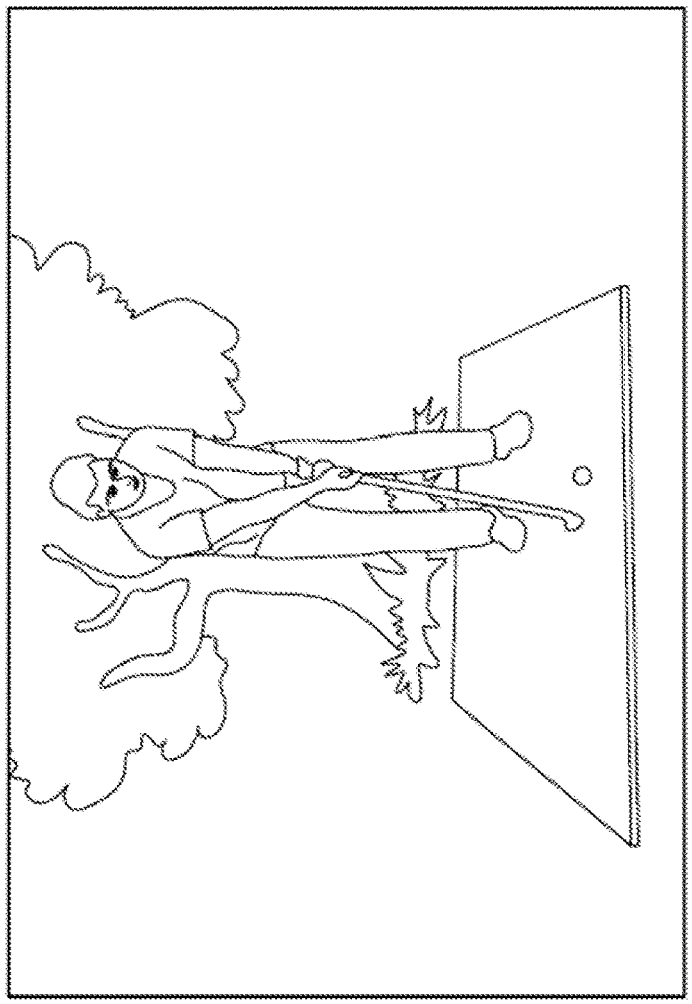
FIG. 7

| Name | Type | Required | Descriptions |
|---|---|---|---|
| 1 uid | String | | Autogenerated ID from firebase |
| 2 userId | String | Yes | Reference to user into associate user details |
| 3 score | String | | What it your target score you want to achieve |
| 4 date | Date | Yes | Date when you inserted your tracker into watchlist. |
| 5 POV | String | Yes | Avatar position |
| 6 zoom | Int | | Zoom Level |
| 7 trackers | String | Yes | Lists of tracker for watchlist item. (Valid Json String) |

FIG. 14

|   | Name | Type | Required | Descriptions |
|---|---|---|---|---|
| 1 | uid | String |  | Autogenerated ID from firebase |
| 2 | name | String | Yes | Tracker name |
| 3 | category | Constant | Yes | Category name (constant) for tracker |
| 4 | descriptions | String | Yes | short description to define tracker |
| 5 | trackerType | String | Yes | Static or Dynamic ways of tracking. |
| 6 | measureUnit | String | Yes | What format do you measure each trackers. Like: degrees, inches, ... |

FIG. 15

| name | type | required |
|---|---|---|
| uid | String | Yes |
| watchlistId | | |
| trackerId | | |
| min | | |
| max | | |
| position | | |

FIG. 16

3D AVATAR GENERATION AND ROBOTIC LIMBS USING BIOMECHANICAL ANALYSIS

CROSS-REFERENCE TO RELATED APPLICATIONS

This application claims the benefit of U.S. Provisional Patent Application Ser. No. 63/193,697, filed May 27, 2021, entitled "3D Avatar Generation Using Biomechanical Analysis", which is hereby incorporated herein by reference in its entirety.

TECHNICAL FIELD

The disclosed technology relates generally to biomechanical analysis of observed actions, with a focus on representing actions through computer-generated three-dimensional (3D) avatars or movement of robotic limbs. Particularly, physical quantities of biomechanical actions can be measured from the observations, and the system can analyze these values, compare them to target or optimal values, and use the observations and known biomechanical capabilities to generate 3D avatars or define movements of robotic limbs.

BACKGROUND

Various proposals have been made to identify human actions from video using pose estimation. Pose estimation refers to computer vision techniques that detect persons or objects in images and video to determine, for example, where and how various body parts are displayed in an image. Pose Estimation techniques can be used for action recognition. Existing technologies for pose estimation have various shortcomings and limitations.

Biomechanics is the study of the applications of mechanical engineering to the human body. Biomechanical analysis is a technique for examining an activity or movement pattern to distinguish its component parts. Existing technologies for Biomechanical analysis have various shortcomings and limitations.

Brief Summary of Embodiments

Systems, methods, and computer readable media are disclosed for applying biomechanical analysis of observed actions, with a focus on representing actions through computer-generated three-dimensional (3D) avatars (e.g., illustrative movements of an avatar provided at a user interface) and/or robotics (e.g., anthropomorphic robots capable of moving like humans or musculoskeletal robots and prosthetics simulating human limbs). Physical quantities of biomechanical actions can be measured from the observations, and the system can analyze these values, compare them to target or optimal values, and use the observations and known biomechanical capabilities to generate 3D avatars.

The system can take measurements of quantifiable aspects of an actor's movement or performance (used interchangeably). For example, the movement may correspond with a user's body motions. These movements or performances may be captured by a camera associated with a user device. The movements can be broken down and assessed with respect to movements of individual body parts (e.g., foot swaying and rotating, shin raising and lowering, knee bending, and other movements associated with walking, etc.).

These individual body part movements may be recorded and analyzed to quantitatively assess the movement or performance. For example, assessments for healthcare determinations, including mobility of a shoulder following a shoulder surgery, may identify movement or performance values associated with each body part. In this example, the movement value of a particular body part, including shoulder joint, bicep, forearm, hand, or other particular body parts associated with the shoulder surgery, may each be tracked and associated with a value. Those measurements can be used in the biomechanical analysis of the performance and generation of 3D avatars or instructions for the movement of robotic limbs to visualize the performance, different aspects of it, or modified versions of it.

The system may use watch lists and motion trackers. A watch list is a list of measurable attributes of the performance that the system is monitoring (that is, measuring throughout the performance of the action), while a motion tracker is the sequence of measurements—the actual values—taken throughout the performance. As detailed herein, the watch lists and motion trackers can be domain specific. The system may enable the creation of one or more motion trackers comprising specific kinematic parameters and/or sequences of motion. The kinematic parameters may comprise position, velocity, acceleration, and/or higher-order derivatives of the position with respect to time. The behavior of higher order derivatives may be implicated in the real or perceived smoothness of motions. For example, the third order derivative (e.g., the derivative after acceleration) may correspond with "jerk" and can amount to smoothing out changes in acceleration. The fourth order derivative may correspond with "snap." In some examples, higher order derivatives may be recognized by the system. The system may determine and/or incorporate various orders of derivatives that may be incorporated with a given domain.

Another aspect of the invention relates to developing a biomechanical understanding of an actor using a neural network. This may be used, for example, to measure human movement such as bending at the waist (forward and back), lifting (up and down movement) and sway (side to side movement). From this the system can automatically generate 3D avatars of the actor from a single-viewpoint recording and detect multiple joints through 3D pose estimation, or the conversion of a 2D pose estimation into a 3D space. In some examples, the system can generate instructions for the movement of robotic limbs (e.g., using an API provided by the robotic device and the system providing instructions in a recognized format to move the robotic limb in accordance with the pose estimation determined by the system). The system can connect those joints to assess kinematic parameters and sequences (e.g., via motion trackers) relative to a specific domain such as sports performance, physical therapy, assessing well-being and/or other domains. For example, to determine the posture of an individual, the kinematic parameters of the joints connected to the torso may be measured and temporally tracked according to short-term degree of bend, lift and thrust across frames as well as the kinematic sequence that is observed and then statistically compared to a database to determine likely meanings of the movement. Kinematic parameters may correspond with measurable attributes of a performance, sometimes limited to a particular context. In some examples, a kinematic parameter is a quantity relating to an actor's performance of an action that is of interest to the biomechanical analysis and that can be derived from observations of the performance.

The system may tailor the component structures of 3D avatars based on domain-specific criteria (i.e. for some domains the system may track more points on the body than for others. For example, in baseball, the system may track what the hands are doing in some detail to accurately capture the nuances of throwing, catching, and batting motions, while for soccer the system may track much less detail in the hands). Other embodiments of the application may correspond with domain-specific criteria in sports, healthcare, physical ailments (e.g., a stroke), or other domains.

In some examples, the identification of the domain is received from an administrative user or other user device via a user interface (UI). Once the selection of the domain is received, the system may select the corresponding points on the body and other domain-specific criteria.

The creation of a watch list may be customized relative to each domain. This may include a weighting of the kinematic parameters and sequences based on various objectives (e.g., which are the most relevant for fault-correction within the domain). The watch list's weighting of which kinematic parameters and sequences are the most relevant within a domain may be as measured against a reference ideal for each respective motion tracker. The watch list may also determine the rank of importance for each watch list item relevant to the domain.

In some examples, a user interface may provide an option to select the watch list items corresponding with a new domain. This may allow the user to create a customized watch list and/or domain. This can also allow the system to correlate body movements or performances captured by the camera of the user device and associate these movements to the new domain.

Various techniques may be used to create and/or manage motion trackers and watch lists. In some embodiments, this may be done dynamically through a UI by clicking, tapping, or otherwise selecting an actor's components (e.g., body parts, clothing, spacing between limbs, etc.) or context objects (e.g., sports equipment, juggling objects, umpire, etc.) in order to select motion trackers that track the kinematic parameters (e.g., position, velocity, acceleration, etc.) of those components and context objects, individually or in groups. Such a tracker or group of trackers may comprise a watch list to assess a performance of an action in a domain. Watch lists enable tracking of, and analytics on, the kinematic parameters for the indicated components throughout the actor's performance of actions against an ideal or some other reference (e.g. viewing a trace of the line between a user's elbows, wrists, and the head of a golf club throughout a golf swing, etc.).

Various UI features may be provided to select one or more components for tracking, grouping selected components into a watch list for subsequent use or analysis, etc. Various UI features may be provided for automatically determining a set of components constituting a watch list, such as through comparison of a user's performance of an action to a recording of an example performance. In some examples, the set of components may be automatically determined through automated processes in the system and described throughout the disclosure. Various UI features may be provided for authoring a watch list through programming and editing tools, such that the watch list can be saved, loaded, built into or imported into applications, selected and activated by users, etc.

The system may use the watch list to record the kinematic parameters (e.g., positions, angles, velocities, etc.) of the components in the watch list during the performance of an action. It may use the recorded kinematic parameters (KPs) to drive analysis of the performance, present information to the user based on the results of watch list analysis, correlate the results of watch list analysis with additional context data to affect what information is presented to the user.

The system may incorporate additional sensor data at runtime to improve the accuracy or visual appearance of the avatar, or to incorporate additional kinematic parameters/sequences.

In some embodiments, the system may apply recorded 3D motion data from a user to an avatar. By way of example this may be used for playback of the user's own performances, enabling the user to watch their own performance (e.g., walking movement to measure gait and predict falling, moving a left arm in a circle to identify range of motion after a shoulder surgery, a golf swing) from any angle (e.g., so they can see what they are doing wrong in the golf swing or the likelihood that they will be off-balance and fall).

In the sports domain, the system may apply one user's recorded KP sequence to another avatar, letting the user (e.g., a golf coach, or user whose performance is recorded) model performances for another user (e.g., the student, whose avatar is then animated using the coach's KP sequence). As another example, the system may apply recorded 3D motion data from a reference video to an avatar. This may enable deriving a KP sequence from video of a reference performance of an action (e.g. a specific pro golfer's tee shot on a 350 yard hole that breaks to the left). Alternatively, it may be used to enable applying a derived KP sequence to the user's avatar (e.g. to show the user how they should tee off on that hole). In the healthcare or other domains, the system may apply the recorded appearance to another avatar to illustrate the movements that may cause further injury or movements that are not fully healed from surgery or physical therapy.

As another example, the system may model performances by applying KP sequences or changes to ranges of motion of a user's avatar in conjunction with physical simulation techniques (physics engines). This may be done in connection with altering values in the KP sequence to simulate changes in performance of an action and the results of those changes (e.g. increasing the user's swing speed by 10% to simulate how far they could drive the ball) or altering range of motion limitations for an avatar to simulate reduced performance under injury or, in physical therapy scenarios, improvements to performance that could be expected with healing from injury.

As another example, the system may assess a user's change in performance over time. This may be used to gauge improvement vs. different training regimens or techniques, gauge performance loss (e.g., when to change a physical therapy routine, or in the sports domain, when to bench a player, either temporarily due to fatigue, semi-permanently due to injury, or permanently because they are unable to compete), compare measurements of motion trackers against experts or other users and ranking the user's performance against such experts or other users based on closest measurements of kinematic parameters and sequences against a target measurement or outcome (e.g. which MLB player really had the "sweetest swing" of all time?).

As another example, the system may model or simulate performances by applying KP sequences with different context objects (i.e. use simulation to show what the user could do, using the user's own motions, if they had different golf shoes, different clubs, a low-drag swimsuit, etc.).

According to another aspect, the system may combine 3D avatar renderings with recorded video. This may be used, for example, for overlaying a time-synchronized 3D avatar rendering with a video recording of a user's performance, to allow the user to compare current performance with past performances (e.g., "show this swing versus my best swing"), overlaying a time-synchronized 3D avatar rendering with a video recording of a reference performance (e.g., "show my best swing versus a specific pro golfer"), and/or automatically detecting and highlighting differences between two performances.

According to another aspect, the system may blend KP sequence data from multiple sources to generate a fused avatar, instructions to move a robotic limb, and/or KP sequence. In some cases, the system may combine multiple KP sequences from the same user to determine an average performance for that user (e.g., "Your typical tee shot looks like this"), combine KP sequences from multiple users to determine an average performance for some action in general, combine portions of KP sequences from selected users to create a hybrid (e.g., tee-shot that's Tiger Woods from the waist up, Jack Nicklaus from the waist down), blend KP sequence data from multiple sources to derive generalized insights relating to the factors affecting performance and/or combine or blend for other purposes.

According to another aspect the system may generate any of the 3D avatars as holograms. Various other features include incorporating 3D avatars into virtual reality environments (e.g., your coach's avatar can be with you at a VR Pebble Beach to demonstrate how to approach each shot), incorporating 3D avatars in to augmented reality environments (e.g., bring a Tiger Woods' avatar along as a hologram golfing partner to play against while you play Pebble Beach in real life), incorporating 3D avatars as part of a mixed-reality experience (e.g., one in which the experience is an arbitrary combination of virtual and real objects and environments), sending a user's performance of an action to be viewed/replayed by someone else in another location (e.g., sending your recordings to your coach), competing against 3D avatars of yourself in VR/AR/MR (e.g., you vs. your best performance) or vs. other avatars (e.g., run the 400 meters vs. Usain Bolt), using 3D avatars to project yourself or your performance, of an action into a different environment (e.g., see yourself play soccer in Wembly Stadium).

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 3 illustrates kinematic parameters and trackers corresponding with various domains, in accordance with the embodiments disclosed herein.

FIG. 7 is an illustrative human movement, in accordance with the embodiments disclosed herein.

FIG. 14 illustrates a data store storing watch list data for a 3D avatar, in accordance with the embodiments disclosed herein.

FIG. 15 illustrates a data store storing tracker data for a 3D avatar, in accordance with the embodiments disclosed herein.

FIG. 16 illustrates a data store storing watch list and tracker data for determining 3D movements by the biomechanical analytics computer system, in accordance with the embodiments disclosed herein.

Figure 1:
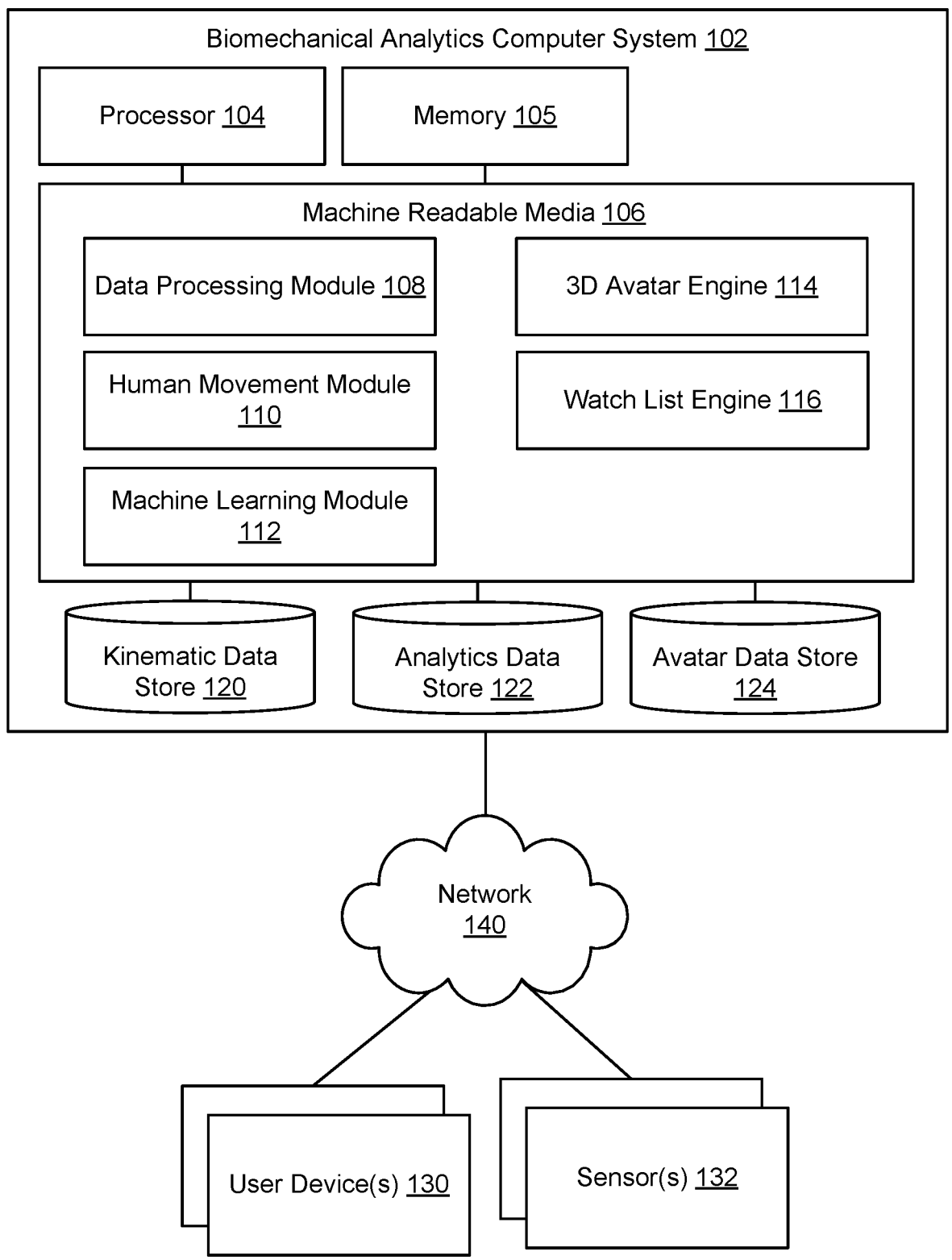
FIG. 1 illustrates a biomechanical analytics computer system, in accordance with the embodiments disclosed herein.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Embodiments disclosed herein describe systems and methods for performing biomechanical analysis of observed actions through 3D avatars and quantification of physical attributes of the actions for comparison to target or optimal values. The physical quantities associated with the actions can be measured from the recorded observations, analyzed, compared to target or optimal values (which may be previously stored) and used for other purposes. The analysis may include analyzing the actions observed by the system to take measurements of quantifiable aspects of the performance. As used herein, the term "performance" includes a single actor's production of an activity at or over a specific point or period of time and/or space. The performance measurements can be used to perform a biomechanical analysis of the performance. The system may further generate 3D avatars to visualize the performance, different aspects of it, or modified versions of it.

Another aspect of the invention relates to the generation of and applications of 3D avatars with biomechanical understanding. Biomechanical understanding is based on a domain that an activity relates to, and to points on the body that are important for performance of that action in that domain. As detailed below, the system and methods described herein can create watch lists and motion trackers. A watch list can be a list of measurable attributes of a performance for a given domain that the system is programmed to monitor or watch for. For example, the watch list may include a list of attributes that the system may measure (e.g., throughout the performance of the action). A motion tracker may include the sequence of measurements (e.g., the actual values, etc.) made throughout the performance.

Among other improvements, these aspects of the invention build on technology that just recognizes a movement or an action by analyzing the actions observed by the system to take measurements of quantifiable aspects of the performance. Those measurements can then drive biomechanical analysis of the performance and generation of 3D avatars to visualize the performance, different aspects of it, or modified versions of it. Watch lists and motion trackers can be pre-authored, created at runtime through a user interface, loaded, saved, modified and otherwise used in connection with various aspects of the invention.

Another aspect of the invention relates to developing a biomechanical understanding of an actor using a neural network. This may be used, for example, to measure human movement such as bending at the waist (forward and back), lifting (up and down movement) and sway (side to side movement). From this the system can automatically generate 3D avatars of the actor from a single-viewpoint recording and detect multiple joints through 3D pose estimation, or the conversion of a 2D pose estimation into a 3D space. Similarly, machine readable instructions may be generated to move the robotic limb. The system can connect those joints to assess kinematic parameters and sequences (e.g., via motion trackers) relative to a specific domain such as sports performance, physical therapy, assessing well-being and/or other domains. For example, to determine the posture of an individual, the kinematic parameters of the joints connected to the torso may be measured and temporally tracked according to short-term degree of bend, lift and thrust across frames as well as the kinematic sequence that is observed and then statistically compared to a database to determine likely meanings of the movement.

The system may tailor the component structures of 3D avatars based on domain-specific criteria. (i.e. for some domains the system may track more points on the body than for others. For example, in baseball the system may track what the hands are doing in some detail to accurately capture the nuances of throwing, catching, and batting motions, while for soccer the system may track much less detail in the hands).

The creation of a watch list may be customized relative to each domain. This may include a weighting of the kinematic parameters and sequences based on various objectives (e.g., which are the most relevant for fault-correction within the domain). The watch lists weighting of which kinematic parameters and sequences are the most relevant within a domain may be as measured against a reference ideal for each respective motion tracker. The watch list may also determine the rank of importance for each watch list item relevant to the domain.

The weights for each domain may be determined by a machine learning model. For example, a plurality of sequential image frames or videos may be provided as input to the model. For a first domain (e.g., swimming, etc.), a kinematic parameter corresponding with a measurement of a quantifiable aspect of an actor's performance may be correlated with a ranking of a performance of the activity (e.g., the speed of swimming, etc.). Various measurements may be determined as well (e.g., moving legs more, moving wrist/arms less, etc.). The body parts, action accessories (e.g., swimsuit, cap, goggles, etc.), or actions corresponding with the greatest performance may be weighted greater than other performances. Body parts and motion sequences corresponding with the greatest performances for the domain may be added to the watch list and/or motion tracker to identify in future input to the trained, swimming-specific machine learning model. For a second domain (e.g., golf, etc.), a kinematic parameter corresponding with a measurement of a quantifiable aspect of an actor's performance may be correlated with a ranking of a performance of the activity (e.g., the accuracy of the golf swing, etc.). Various measurements may be determined as well (e.g., twisting more at the hips, following through with the golf club at the end of the golf swing, etc.). The body parts, action accessories (e.g., hat, glove, etc.), or actions corresponding with the greatest performance may be weighted greater than other performances. Body parts and motion sequences corresponding with the greatest performances for the domain may be added to the watch list and/or motion tracker to identify in future input to the trained, golf-specific machine learning model.

For purposes of example only, various aspects of the description will refer to and use the sporting examples (e.g., golf swing, etc.) as an example action. The invention is not limited to these actions and the principles and concepts may be applied to other sports or movements, including soccer, baseball, or human movements in other domains. This may include dance and other performance arts, physical therapy, or wellness assessments.

Various technical improvements are described throughout the application. For example, the body movements or performance may be tracked for different domains, which can reduce the amount of data that is generated and stored with the system when other body movements are not associated with a particular domain. This may be helpful when storage availability is limited at the user device. Also, less data may be transferred between the mobile device (that is generating the images of the movements or performance) and a backend system that may be training a machine learning model or performing other resource intensive processes that a mobile device would be unable to perform. These and other technical improvements may be realized through various embodiments and implementations of the system described herein.

FIG. 1 illustrates a biomechanical analytics computer system, in accordance with various embodiments disclosed herein. In this example, biomechanical analytics computer system 102 may communicate with one or more user devices 130, sensors 132 via network 140 and/or other hardware and software. Biomechanical analytics computer system 102 may include processor 104, memory 105, and machine-readable storage medium 106 in communication with one or more data stores, including kinematic data store 120, analytics data store 122, and avatar data store 124. Additional embodiments of biomechanical analytics computer system 102 and one or more user devices 130 are provided with FIG. 11.

Processor 104 may be one or more central processing units (CPUs), semiconductor-based microprocessors, and/or other hardware devices suitable for retrieval and execution of instructions stored in machine-readable storage medium 106. Processor 104 may fetch, decode, and execute instructions to control processes or operations for optimizing the system during run-time. As an alternative or in addition to retrieving and executing instructions, processor 104 may include one or more electronic circuits that include electronic components for performing the functionality of one or more instructions, such as a field programmable gate array (FPGA), application specific integrated circuit (ASIC), or other electronic circuits.

Memory 105 may comprise random-access memory (RAM) or other dynamic memory for storing information and instructions to be executed by processor 104. Memory 105 might also be used for storing temporary variables or other intermediate information during execution of instructions to be executed by processor 104. Memory 105 may also comprise a read only memory ("ROM") or other static storage device coupled to a bus for storing static information and instructions for processor 104.

Machine readable media 106 may be any electronic, magnetic, optical, or other physical storage device that contains or stores executable instructions. Thus, machine-readable storage medium 106 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 106 may be a non-transitory storage medium, where the term "non-transitory" does not encompass transitory propagating signals. As described in detail below, machine-readable storage medium 106 may be encoded with executable instructions for running various processes and engines described throughout the disclosure.

Machine readable media 106 may comprise one or more applications, engines, or modules executed by processor 104, including data processing module 108, human movement module 110, machine learning module 112, 3D avatar engine 114, and watch list engine 116.

Data processing module 108 may receive data from user device(s) 130, sensor(s) 132, or other sources. The data may be stored in analytics data store 122 in association with the human user that is performing a human movement.

Data processing module 108 may adjust the quality of the image or video from user device(s) 130, sensor(s) 132, or other sources. For example, the image quality may be measured against a threshold value to determine if the image is too bright, too dark, etc. Data processing module 108 may adjust various camera characteristics and camera positions for the image or video data including, but not limited to, angle, tilt, or focal length.

Data processing module 108 may adjust the image or video by automatically changing the frames per second input value. For example, the image quality can be determined to be above the threshold value. Data processing module 108 may initiate down-sampling, compression, or decimation to resample the image or video and reduce the image quality and/or match a predetermined frames per second value.

Data processing module 108 may determine one or more derivative values (e.g., third order or jerk, fourth order or snap, etc.). The measurement of values in the motion trackers from the input images may be used to calculate the derivation of kinetic parameters from motion tracker recordings.

Human movement module 110 may access the images or video stored in analytics data store 122 and identify a human movement that is closest to the movement performed in the images or video. The available human movements may be stored in kinematic data store 120. In some examples, the available human movements may be stored in kinematic data store 120 may be compared with the received images or video stored in analytics data store 122. Human movement module 110 may determine the human movement with the highest likelihood of matching (e.g., the greatest percentage match, the percentage match above a threshold value, etc.).

Human movement module 110 may identify objects other than the user in the images, track kinematic parameters of the objects in the images, and generate context data based on the tracked kinematic parameters of the objects. The objects identified may vary based on the domain. For example, a juggling domain may track more than one non-user object (e.g., each of the objects that the human user is tossing and catching, etc.), while soccer may track a single object in the domain (e.g., the soccer ball, etc.).

The domain may be selected via the user device at a user interface. For example, the user interface may display a set of domains, where each domain corresponds with a set of pre-determined kinematic parameters or trackers. Once the user via user device 130 selects a domain provided at the user interface, human movement module 110 may determine the corresponding kinematic parameters associated with the selected domain. Using the predetermined kinematic parameters associated with the selected domain, user device 130 may capture the movements of the user through a camera, as described herein. Biomechanical analytics computer system 102 may identify a subset of the body parts captured in the images as points of the human body that will be tracked through the time range of the movement in accordance with the selected domain. In other words, each of the moving body parts may be recorded by user device 130, but only a subset of those body parts may be analyzed in accordance with the disclosed embodiments.

Figure 2:
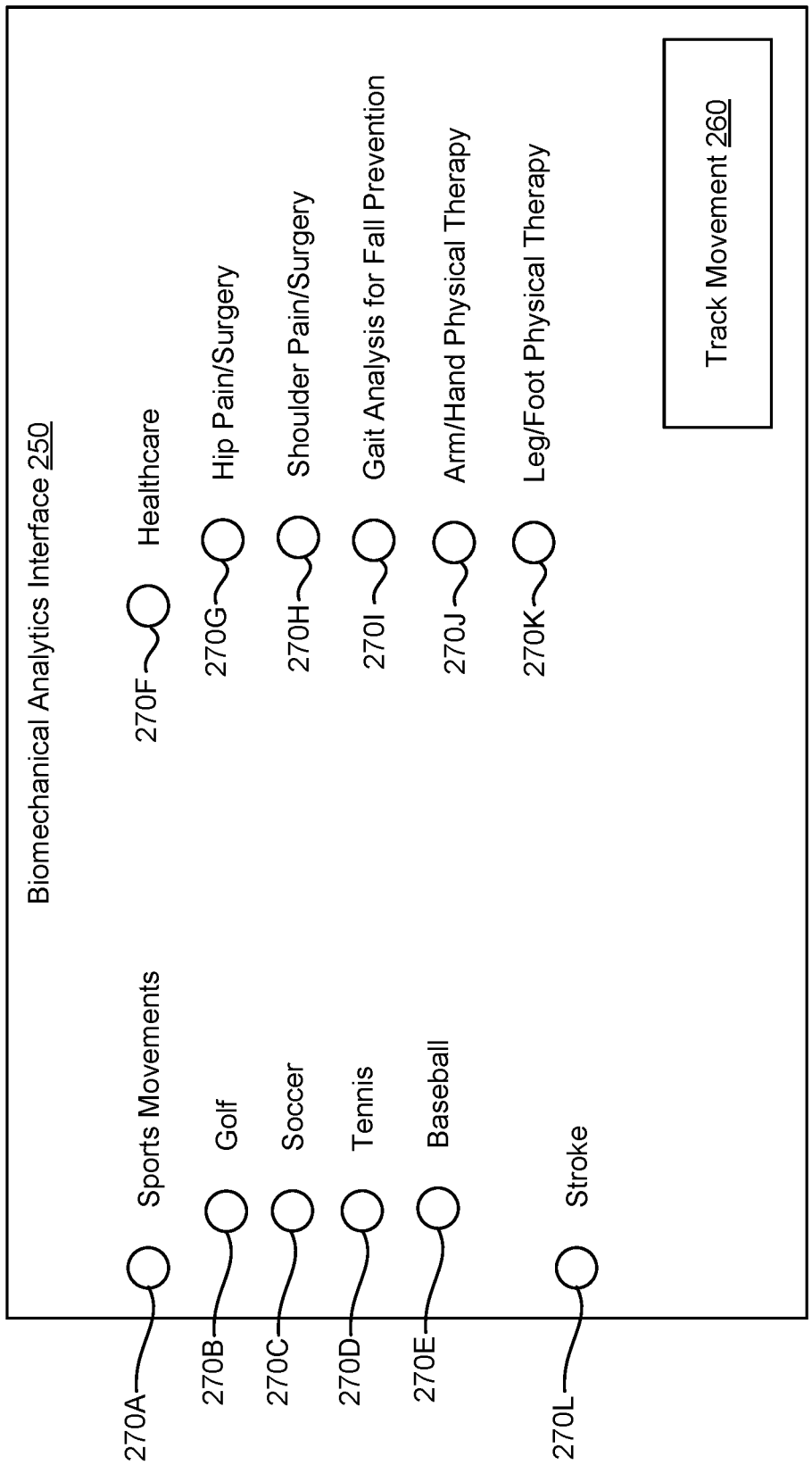
FIG. 2 illustrates a biomechanical analytics interface, in accordance with the embodiments disclosed herein.

An illustrative user interface is provided with FIG. 2. In this illustration, biomechanical analytics interface 250 provides a set of domains 270 for display that the user may choose between. Once domain 270 is selected, the user may transmit the selected domain by selecting tool 260 provided via the user interface 250. The tool 260 may be configured to automatically transmit the selected domain via network 140 to biomechanical analytics computer system 102 (specifically, human movement module 110).

Various domains are provided for illustrative purposes. For example, the set of domains 270 illustrated in FIG. 2 may comprise, for example, one or more sports movement domains 270A (e.g., golf 270B, soccer 270C, tennis 270D, baseball 270E), one or more healthcare movement domains 270F (e.g., hip pain/surgery 270G, shoulder pain/surgery 270H, gait analysis for fall prevention 270I, arm/hand physical therapy 270J, leg/foot physical therapy 270K), movements that correspond with the user having a stroke 270L, or other movements and performances. Each of these domains may correspond with one or more kinematic parameters or trackers, as illustrated in FIG. 3.

For example, gait analysis for fall prevention 270I may initiate an analysis of the walking movement to measure gait and predict falling. Biomechanical analytics computer system 102 may receive one or more images and other information from recorded by user device 130. Human movement module 110 may measure and analyze individual components of the kinematic sequence of walking. Various determinations may be generated from the measurement and analysis of the movements, including to monitor fall risk, detect deterioration of balance during normal course of aging, identify possible areas for improvement through physical therapy, and/or monitor progress of such therapy.

In another example of the instructions to move a robotic limb, the set of kinematic parameters and sequences may be derived to optimize movement for balance, gait, thrust, posture, or other KPs and trackers. When a user associated with the robotic arm and the robotic arm is moving in response to the machine readable instructions, the robotic arm can adjust to the ideal kinematic parameters. As an illustrative example, the sway may be six degrees when a user walks. The system can generate instructions to adjust the movement of the robotic limb and bring the sway to zero. Similarly, the system can learn the ideal gait for the user and try to assist the user in achieving it.

FIG. 3 illustrates kinematic parameters and trackers corresponding with various domains, in accordance with the embodiments disclosed herein. In this illustration, biomechanical analytics computer system 102 may receive the selected domain from biomechanical analytics interface 250 and determine the corresponding kinematic parameters or trackers for that domain. Various domains are provided for illustrative purposes at FIG. 3, including shoulder pain/surgery domain 350A and stroke domain 350B.

For example, when shoulder pain/surgery domain 350A is selected at biomechanical analytics interface 250 in FIG. 2, biomechanical analytics computer system 102 may correlate the domain with a set of kinematic parameters or trackers 352 to track the movements corresponding with that domain. In one example, head lift and tilt tracker 352A, shoulder speed tracker 352B, and back rotation tracker 352C may correlate with the shoulder pain/surgery domain 350A. In another example, back rotation tracker 354A, shoulder movement 354B, and bicep swing 354C may correlate with the stroke domain 350B. The kinematic parameters or trackers may be preset and stored at kinematic data store 120.

In some examples, biomechanical analytics interface 250 may incorporate an software development kit (SDK) that allows the user to create a new domain. For example, the user can track a movement (e.g., rotation, speed, etc.) of a particular body part by defining the movement in the SDK (e.g., including storing the kinematic parameters and trackers at kinematic data store 120). Once the new movement is defined as a new domain, biomechanical analytics interface 250 may include the new domain on its display. The user may select the new domain from biomechanical analytics interface 250 and corresponding kinematic parameters or trackers may be identified upon selection of the domain.

In some examples, biomechanical analytics interface 250 may incorporate an software development kit (SDK) that allows the user to create one or more new kinematic parameters associated with an existing or new domain. For example, the user can select one or more body parts (e.g., skeletal bones, joints, muscles, etc.) that the system may identify and track a movement (e.g., rotation, speed, etc.) via the variables and other tools provided by the SDK. Each of these identified body parts may create a new kinematic parameter or tracker in newly received images from the user device 130. Once the new kinematic parameter or tracker is defined, biomechanical analytics interface 250 may allow the new kinematic parameter or tracker to correlate to a previously defined or newly defined domain.

The SDK may be transmitted and installed at user device 130 to assist with the definition of the kinematic parameters corresponding with the newly-defined movement. The SDK may comprise runtime environment variables, drivers, network protocols, or other information needed to define the kinematic parameters or trackers and store them at kinematic data store 120.

Using each of these correlations between domains and kinematic parameters or trackers (e.g., in previously-defined domains or newly-defined domains), human movement module 110 may identify the movements corresponding with the particular domain and determine values associated with the movements. For example, when tracking head lift and tilt tracker 352A is activated for the shoulder pain/surgery domain 350A, the movement of the body parts that are specific to the selected domain may be measured (e.g., change in 1-degree tilt, movement left along the X-axis 3 points, etc.).

Returning to FIG. 1, various objects other than body parts may be associated with a domain. The objects associated with the domain and tracked as part of the movement or performance may be identified within a bounding box. For example, human movement module 110 may identify a rectangular space around the domain specific objects, including a user's body parts that correspond with the domain and any relevant non-user objects for the domain. Coordinates of the bounding box may be identified in the first image frame. As the movement progresses, the outline of the bounding box may be adjusted for subsequent image frames to encompass the same user's body parts and relevant non-user objects for the domain that were identified in the initial image frame. The objects that are captured within each bounding box may be added to the watch list and the objects that are outside the bounding box may be removed from the watch list (e.g., to help limit clutter and irrelevant objects as input to the machine learning model, etc.).

Machine learning module 112 may access analytics data store 122 and learn dependencies between limbs and joints using a large set of images and video of human movements captured from user devices 130 and sensors 132. The machine learning model may be, for example, a deep convolution neural network. The mapping may be stored as a representation of available human movement kinematic data store 120.

Machine learning module 112 may generate a 3D model from a 2D model. For example, data processing module 108 receives a stream of images or video from user device(s) 130, sensor(s) 132, or other sources and sends them frame by frame to machine learning module 112 as a 2D image. Machine learning module 112 may generate a 2D frame for each image frame. In some examples, each 2D frame may contain 2D coordinates for each body part or some subset thereof (e.g., the body parts or limbs that are moving in a particular context, etc.). Machine learning module 112 may collect the 2D frames and start streaming these frames to a 3D ML model. In addition to set of 2D frames, machine learning module 112 may send the 3D ML model various parameters, including body measurements, camera settings or intrinsic values, environment conditions, and the like. The output of this process may comprise a set of frames with 3D coordinates.

Machine learning module 112 may implement an inference process based on a machine-learned model. For example, the body parts included in the watch list may be tracked for movement, angle, rotation, and the like. These changes in position may be data points that are input to a machine learning model that are used to infer a resulting action in the context (e.g., jumping over a hurdle, hitting a ball with a racquet, etc.).

Figure 4:
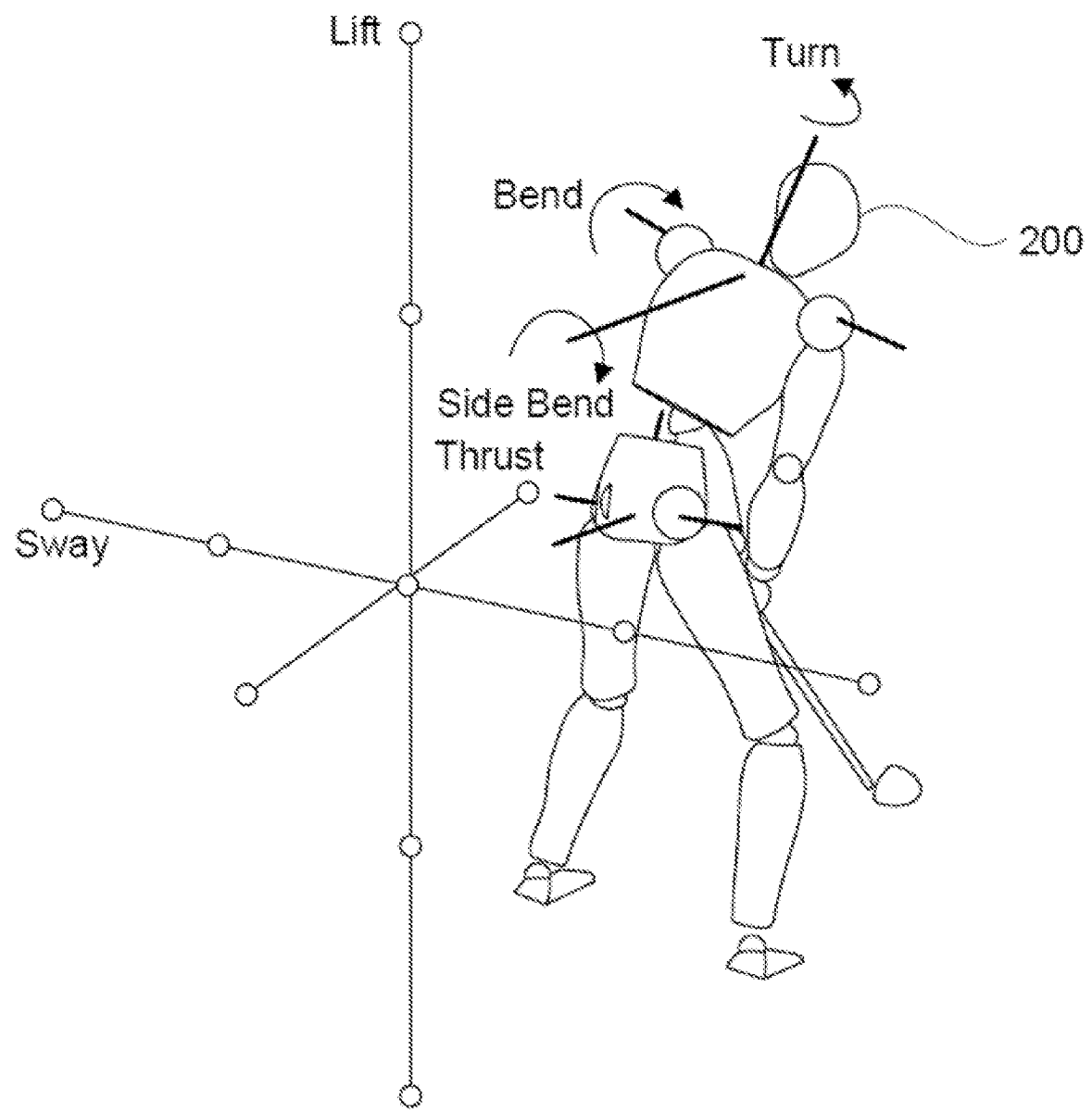
FIG. 4 illustrates 3D avatar generated by a biomechanical analytics computer system, in accordance with the embodiments disclosed herein.

Machine learning module 112 may determine the coordinates of the bounding box. For example, the bounding box may be determined based on objects identified in the image frame and/or based on similar images in the same domain during the ML training process. 3D avatar engine 114 may automatically generate a 3D avatar from images or video stored in analytics data store 122 (e.g., a single-viewpoint recording from one or more sensors 132, etc.). This may include detecting multiple joints through a 3D pose estimation. For example, a 3D pose estimation may produce a 3D pose that matches the spatial position of the depicted human (e.g., bending at the waist, twisting, etc.). An illustrative 3D avatar 200 is provided with FIG. 4.

3D avatar 200 may mimic human movement based on biomechanical limitations of the human body as well as human movement based on images and/or video received from user device 130 or sensors 132. 3D avatar 200 may be generated to comply with motion limitations that are reflective of the actual capabilities of the user. 3D avatar 200 may move along one or more three-dimensional planes, axes, or space, including an X-axis (e.g., swaying movement, etc.), Y-axis (e.g., lifting movement, etc.), or Z-axis (e.g., thrusting movement, etc.). The three-dimensional layout may correspond with a geometric layout, using the terms axes, space, and planes interchangeably. In the context of motion, "axis" or "axes" may be used since motion may be inherently one-dimensional along a direction. A combination of axes may be identified as well for a particular movement, including turning (e.g., X-axis and Z-axis, etc.), bending (e.g., Y-axis and Z-axis, etc.), and the like.

In some examples, the 3D pose estimation may correspond with a model-based generative method. For example, 3D avatar engine 114 may treat the human body as an articulated structure with a model that includes each human body part and the spatial relationship between adjacent parts. The model may remain in 3D to standardize limbs. For example, the perceived length of a limb in 2D can vary as the three-dimensional limb is projected into a 2D viewing plane, but the limb length in 3D can be constant relative to other limbs and their movements.

In some examples, the 3D pose estimation may correspond with a discriminative method or regression. After extracting features from the image, a mapping may be learned (e.g., via machine learning module 112, etc.) from the feature space to the pose space. Using the articulated structure of the human skeleton (e.g., stored in kinematic data store 120, etc.) the joint locations may be highly correlated and predictable based on the limitations of each limb/joint.

In some examples, the 3D pose estimation may predict a motion of objects in the context as well. For example, when a ball is hit, the trajectory of the ball may be mapped with the pose space performed by the avatar. The motion of other domain objects may correspond with the movement of the 3D avatar in conjunction with the limitations of the biomechanical analysis.

In some examples, 3D avatar engine 114 may detect multiple joints through a conversion of a 2D pose estimation into a 3D space and connecting those joints to assess kinematic parameters and sequences (e.g., motion trackers, etc.) relative to a specific domain.

For example, to determine the posture of an individual, the kinematic parameters of the joints connected to the torso may be measured and temporally tracked according to short-term degree of bend, lift, and thrust. The temporal tracking may be identified across frames as well as the kinematic sequence that is observed. The data may be statistically compared to kinematic data store 120 (e.g., available movements of joints and limbs, etc.) determine likely meanings of the movement. For example, a threshold amount of forward bend in the torso followed by a return to a vertical, no-bend posture may be determined to have the meaning of a "polite bow."

3D avatar engine 114 may generate a 3D avatar by tailoring the component structures of 3D avatars based on domain-specific criteria. The generation of specific criteria for domains, exceptions, and/or subdomains can enable the system to process information more efficiently. The component structures of 3D avatars may include body points that correspond with pose, movement, alignment, and other features that are related to the domain or activity.

For example, for some domains it may be desirable to track more points on the body than for others. For example, in the domain of baseball, it may be desirable to track what the hands are doing in some detail to accurately capture the nuances of pitching, throwing, catching, and batting motions. In contrast, in the domain of soccer activity, it may be desirable to track what the feet and head are doing in some detail to accurately capture the nuances of kicking and heading a ball, whereas the hands are generally not relevant. However, the system may provide for exceptions (or subdomains). For example, in the soccer domain, the hands are generally not relevant to the action. An exception relates to the goalie or when a player is doing a throw in.

These exceptions or subdomains may be handled by the system by detecting context. For example, by detecting a player who is in the goal area with their back to the goal, the system can identify this object (person) as a goal tender and it may be desirable to track what the goal tender's hands are doing in some detail to accurately capture the nuances of goal tending. When a player is doing a throw-in from a sideline, the system may use context (e.g., the fact that a player has a ball and is outside the field of play and other items of context) identify this object (person) as a player doing a throw-in and it may be desirable to track what the player's hands are doing in some detail to accurately capture the nuances of the throw-in.

In some generic systems, the movement tracking body points may correspond with generic body movements. For example, with walking, the generic system may track the movement of a user's feet, knees, arms, and shoulders that may swing forward and backward when a person walks down the street. In the improved domain-specific system, the points on the body (e.g., corresponding with the watch list, etc.) may correspond with additional points that can effect the power, speed, efficiency, accuracy, and other magnitudes of the performed movement (e.g., the distance, accuracy, height of the baseball hit by the bat, the speed of the long distance runner, the height and distance of the hurdle jumper, etc.).

In some examples, the additional body points can be used to generate a 2D model prior to generating the 3D model. As discussed herein, machine learning module 112 may generate a 2D frame for each image frame. In some examples, each 2D frame may contain 2D coordinates for each body part or some subset thereof (e.g., the body parts or limbs that are moving in a particular context, etc.). Machine learning module 112 may collect the 2D frames and start streaming these frames to a 3D ML model.

3D avatar engine 114 may generate a 3D avatar by incorporating kinematic parameters and sequences so that the 3D avatar is biomechanically representative of the intended activity. This may include accessing kinematic data store 120 to identify available human movements for the activity and associating the images/video from analytics data store 122 (e.g., using human movement module 110, etc.).

3D avatar engine 114 may apply recorded 3D motion data from a user to an avatar for various purposes. Some non-limiting example uses include the following: i) playback of the user's own performances (e.g., their own golf swing) to enable the user to watch their own performance (e.g., golf swing) from any angle so they can see what they may be doing wrong; ii) apply one user's recorded kinematic parameter sequence to another avatar, to enable a first user (e.g., a golf coach, whose swing is recorded) to model performances for a second user (the student, whose avatar is then animated using the coach's kinematic parameter sequence).

In another example, 3D avatar engine 114 may apply recorded 3D motion data from a reference video to an avatar. For example, human movement module 110 can derive a kinematic parameter sequence from a video of a reference performance of an action (e.g., a golf professional's tee shot on a 350 yard hole that breaks to the left). 3D avatar engine 114 can apply this derived kinematic parameter sequence to the user's avatar (e.g., to show the user how they should tee off on that hole).

In some examples, additional sensor data may be incorporated with 3D avatar 200 at runtime to improve the accuracy or visual appearance of 3D avatar 200, or to incorporate additional kinematic parameters/sequences (e.g., 3D motion, etc.). For example, the 3D avatar 200 can play back the user's own performances (e.g., their own golf swing) to enable the user to watch their own performance (e.g., golf swing) from any angle so they can see what they may be doing wrong. In another example, the 3D avatar 200 can perform human movement in the user's recorded kinematic parameter sequence. The movement can be used to generate a second 3D avatar to enable a first user (e.g., a golf coach, whose swing is recorded) model performances for a second user (e.g., the student, whose avatar is then animated using the coach's kinematic parameter sequence).

In some examples, data may be augmented. For example, previously recorded actions may be provided as input to the machine learning (ML) model for training. The previously recorded actions may be domain-specific, such that the ML model may be trained on the previously recorded actions to correlate how kinematic parameters/sequences can generate different results. The trained ML model may be used to analyze the user's input from user device 130 or sensors 132 and generate a motion sequence for 3D avatar 200 as output.

In some examples, performances may be modeled by 3D avatar 200 by applying kinematic parameter sequences or changes to ranges of motion in conjunction with physical simulation techniques (e.g., physics engines). For example, this may include altering values in the kinematic parameter sequence to simulate changes in performance of an action and the results of those changes (e.g., increasing the user's swing speed by 10% to simulate how far they could drive the ball). In some examples, this may include altering range of motion limitations for 3D avatar 200 to simulate reduced performance under injury or, in physical therapy scenarios, improvements to performance that could be expected with healing from injury.

In some examples, performances may be modeled by 3D avatar 200 by applying kinematic parameter sequences or changes to ranges of motion to help assess a user's change in performance over time. This may be used to gauge improvement vs. different training regimens or techniques, gauge performance loss (when to bench a player, either temporarily due to fatigue, semi-permanently due to injury, or permanently because they are unable to compete), compare measurements of motion trackers against experts or other users and ranking the user's performance against such experts or other users based on closest measurements of kinematic parameters and sequences against a target measurement or outcome (e.g. which MLB player really had the "sweetest swing" of all time?).

In some examples, performances may be modeled or simulated by 3D avatar 200 by applying kinematic parameter sequences with different context objects. For example, the simulation may be altered to show what the user could do, using the user's own motions, if they had different golf shoes, different clubs, a low-drag swimsuit, etc.

When instructions for movement of a robotic limb are generated instead of an avatar, similar computations and determinations may be made. For example, the robotic limb may include one or more partial musculoskeletal components in a mechanical device that is communicatively coupled with biomechanical analytics computer system 102. The KPs and trackers may be determined. As an illustrative example, biomechanical analytics computer system 102 can measure balance, gait, thrust, rotation, or other movements in coordination with the limitations of the skeletal form and then compare and adjust the robotic limb to an ideal kinematic measurement or sequence.

3D avatar engine 114 may generate an optimal or best avatar corresponding with a body type. For example, the system may generate a generic avatar for a subset of body types (e.g., nine general body types, etc.), age ranges, or capability thresholds. Each generic avatar may correspond with kinematic parameter sequence data that can perform optimally for that body type. For example, for users taller than six-foot, five-inches weighing less than 150 pounds, the rotation of the wrist may correspond with a first value and for users taller than six-foot, five-inches weighing between 151-200 pounds, the rotation of the wrist may correspond with a second value and the rotation of the left knee may correspond with a third value. In another example, the avatar corresponding with users over sixty-five may have a limited range of motion.

3D avatar engine 114 may generate an optimal or best avatar corresponding with a user. In some examples, the system may generate an specialized avatar for a particular user based on similar body types or a pro user with a similar body type. In other examples, the system may generate an specialized avatar for a particular user based on historical data from the user (e.g., your best swing in 2021, etc.).

3D avatar engine 114 may combine 3D avatar renderings with recorded video. For example, 3D avatar engine 114 may overlay a time-synchronized 3D avatar rendering (e.g., 3D avatar 200) with a video recording of a user's performance. This may allow the user to compare a current performance illustrated by 3D avatar 200 with a past performance (e.g., to compare this swing versus my best swing, etc.). In some examples, 3D avatar engine 114 may overlay a time-synchronized 3D avatar rendering with a video recording of a reference performance (e.g., to compare my best swing to a golf professional, etc.). In some examples, 3D avatar engine 114 may automatically detect and highlight differences between two performances.

3D avatar engine 114 may blend kinematic parameter sequence data from multiple sources to generate a fused avatar and/or kinematic parameter sequence. In some examples, 3D avatar engine 114 may combine multiple kinematic parameter sequences from the same user to determine an average performance for that user (e.g., "Your typical tee shot looks like this"). In some examples, 3D avatar engine 114 may combine kinematic parameter sequences from multiple users to determine an average performance for some action in general. In some examples, 3D avatar engine 114 may combine portions of kinematic parameter sequences from selected users to create a hybrid (e.g., tee-shot that corresponds with Tiger Woods from the waist up and Jack Nicklaus from the waist down).

3D avatar engine 114 may blend kinematic parameter sequence data from multiple sources to derive generalized insights. This may include a repetitive position or motion of a body part that is identified in a threshold number of image frames. This may include generating a generalized 3D avatar 200 relating to various factors affecting performance.

3D avatar engine 114 may generate 3D avatar 200 as a hologram. This may include applying 3D avatar technology to the hologram, virtual reality (VR), augmented reality (AR), and/or mixed-reality (MR) space. In some examples, 3D avatar engine 114 may incorporate 3D avatars into virtual reality environments (e.g., your coach's avatar can be with you at a VR Pebble Beach to demonstrate how to approach each shot). In some examples, 3D avatar engine 114 may incorporate 3D avatars into augmented reality environments (e.g., bring Tiger Woods' avatar as a hologram golfing partner to play against, while the user plays at Pebble Beach in real life). In some examples, 3D avatar engine 114 may incorporate 3D avatars as part of a mixed-reality experience (e.g., one in which the experience is an arbitrary combination of virtual and real objects and environments).

3D avatar engine 114 may transmit 3D avatar 200 to a user device. For example, 3D avatar engine 114 may send a user's performance of an action to be viewed or replayed by someone else in another location (e.g., sending your recordings to your coach).

3D avatar engine 114 may initiate a simulation. For example, 3D avatar engine 114 may initiate a competition between a human user (in real life) and a 3D avatar of the human user in VR/AR/MR (e.g., you vs. your best performance). In another example, 3D avatar engine 114 may initiate a competition between a human user against other avatars (e.g., run the 400 meters vs. Usain Bolt).

3D avatar engine 114 may use one or more 3D avatars to project a human user or a particular performance of an action into a different environment (e.g., see yourself play soccer in Wembly Stadium). In other examples, 3D avatar engine 114 may use 3D avatars for live or recorded distant messaging (e.g., appear as a 3D avatar in real time a meeting in a different city, or appear as a recorded message sent to a soldier on deployment sending an avatar message back home).

Watch list engine 116 may generate a watch list and/or motion tracker. The watch list may correspond with a list of measurable attributes of a performance that the system is programmed to monitor or watch for (e.g., in images or video from user device 130 or sensors 132, etc.). For example, the watch list may include a list of attributes that the system may measure (e.g., throughout the performance of the action). A motion tracker may include the sequence of measurements or actual values that are generated throughout the performance.

Watch list engine 116 may create one or more watch lists relative to each domain. This may include weighting which kinematic parameters and sequences are the most relevant for analysis within that domain. As one example, the analysis may be used to aid in fault-correction. As a result, the weighting of which kinematic parameters and sequences are the most relevant for analysis within that domain may take into account the common faults within the domain.

Watch list engine 116 may incorporate the watch lists and motion trackers with 3D avatars. Motion trackers track the movement of domain-specific kinematic parameters and sequences. The movement may include, for example, sway, thrust, and lift as well as the rotational movement of each kinematic parameter. This may help track human-like movement including bend, turn, rotation velocity, rotational angles, rotational space, or rotational sequence of kinematic parameters. Watch lists may include a weighting of which kinematic parameters and sequences are the most relevant for fault-correction within the domain as measured against a reference ideal for each respective motion tracker. The watch list may also include a ranking or a relative ranking of importance for each watch list item relevant to the domain.

Watch list engine 116 may incorporate additional information with 3D avatar 200. In some examples, the watch list can include temporal measurements to track time-related concepts such as tempo, beat, and rhythm. The temporal measurements can be incorporated with 3D avatar 200 to further correspond with human movement.

Watch list engine 116 may generate a dynamic watch list. Dynamic watch lists may be created dynamically through a user interface at user device 130 by selecting (e.g., by selecting, tapping on, etc.) an actor's components and/or on context objects. Once the actor's components and/or on context objects are selected, one or more motion trackers may determine the kinematic parameters (e.g., position, velocity, acceleration, etc.) of those components and context objects, individually or in groups. The motion trackers may form a dynamic watch list as a list of things the system is watching in order to assess a performance of an action. Watch lists can enable tracking of, and analytics on, the kinematic parameters for all indicated components throughout the actor's performance of some action. In some examples, the actor's performance may be compared with a stored performance (e.g., viewing a trace of the line between the user's elbows, wrists, and the head of a golf club throughout a golf swing, etc.).

Kinematic data store 120 may comprise a plurality of the available human movements that can be performed by human users. These limitations may correspond with the movement of joints and limbs in the human body and identify a range of motion.

Analytics data store 122 may comprise images of human users captured by sensors 132. In some examples, the data may also comprise interactions and/or feedback from human users as provided to a user device 130 and transmitted via network 140 to biomechanical analytics computer system 102. In some examples, the feedback may include a comment from a user or coach (e.g., voice or text) or comments on a session from other users (e.g., a session corresponds with a plurality of actions associated with a user during a time frame, etc.).

Avatar data store 124 may comprise 3D avatars that are generated by the system. The 3D avatars may simulate human movement based on machine readable instructions that correspond with biomechanical limitations determined by the system.

User device(s) 130 may comprise one or more processors, machine-readable storage media, interfaces, and/or sensors. For example, the interface may display information (e.g., generated and transmitted by biomechanical analytics computer system 102, etc.) and may receive feedback from the user through interactions with the interface. The feedback may be transmitted to biomechanical analytics computer system 102 and processed by data processing module 108.

Sensor(s) 132 may comprise one or more cameras for capturing images and video of human movement. The human movement may include bending (e.g., at the waist, forward and backward, etc.), lifting (e.g., up and down movement, etc.), swaying (e.g., side to side movement, etc.), and various other movements that may be performed. The images and video may be transmitted to biomechanical analytics computer system 102 and processed by data processing module 108.

Sensor(s) 132 may comprise accelerometers, stress or strain gauges, or other sensors that can measure motion or activity. These sensor values can be helpful for measuring kinematic parameters that may be difficult to assess visually (e.g., through camera images, etc.). Network 140 may comprise a two-way communication network for transmitting signals that carry digital data streams representing various types of information. Additional information regarding network 140 and corresponding components is provided with FIG. 18.

Figure 5:
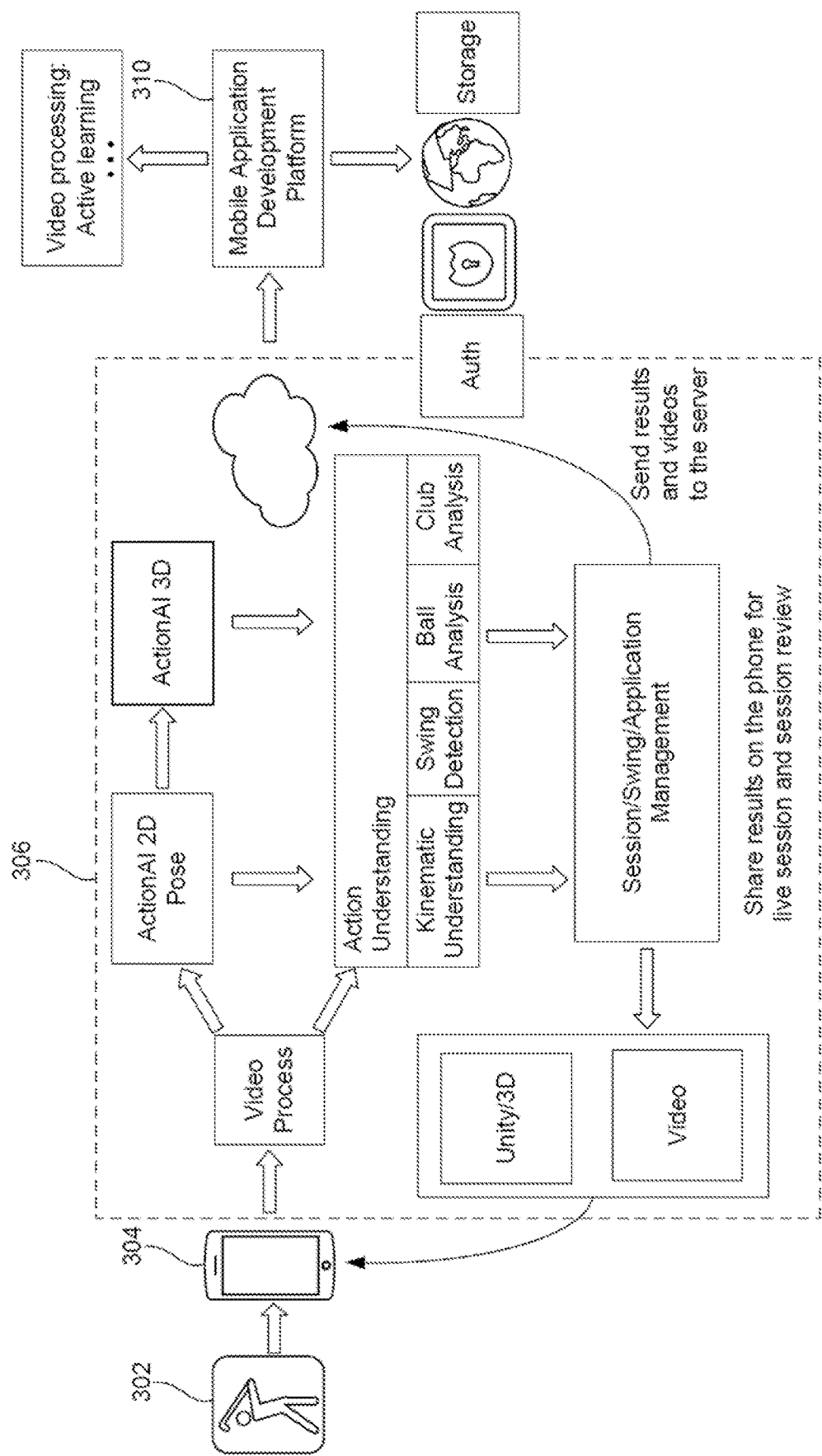
FIG. 5 is an illustrative process for determining 3D human movement, in accordance with the embodiments disclosed herein.

FIG. 5 is an illustrative process for determining 3D human movement, in accordance with the embodiments disclosed herein. In the illustrative process, an actor's performance 302 may be recorded by user device 304 and transmitted to biomechanical analytics computer system 306. The performance may be processed and analyzed, and a 3D avatar may be generated. User device 304 and biomechanical analytics computer system 306 may be similar to one or more user devices 130 and biomechanical analytics computer system 102 illustrated in FIG. 1.

A user may operate user device 304 to access a registration or sign-up portal. A user profile may be generated and stored with the system. User device 304 may access a login network document to provide user credentials and/or password to gain access to the system.

User device 304 may start a new recording of the action comprising the human movement. The camera may be configured to record the action and to help improve 2D and 3D accuracies. In some examples, the system may determine camera characteristics such as type of the camera, focal length, angle, and/or tilt using a Software Development Kit (SDK) and/or Application Programming Interface (API) to determine the camera characteristics from the user device. In some examples, a camera setup or other instructional video may be provided to the human user to help setup the camera.

In some examples, user device 304 may execute a camera application to capture a set of different movements. For example, the camera application may determine a magnitude of an object within an image frame. This data may be used by the camera application (or transmitted to biomechanical analytics computer system 102) to correct balance, shutter speed, light, focal length, etc. to captured objects.

In some examples, the camera may start recording automatically once the camera set-up is completed. The camera may record continuously. In some examples, user device 304 may keep only store frames from the start of a "real" action (as detected by user device 304) to the end of action. Practice actions or performances may be discarded. A "real" action may be defined as when contact with the ball/equipment has been made or when music starts.

In some examples, the camera application may be optimized to capture objects that are recognized in the particular context. For example, objects in the image frame may be compared with a data store of known objects, including various types of sports equipment, accessories, and the like. When an object is identified, the corresponding context may be associated with the image frame as including the equipment or accessory corresponding with the domain/activity.

In some examples, the camera measurements may be used to generate 3D model coordinates. For example, the known distance between a user and a camera may be used to determine a distance between two shoulders on a user or the length of a golf club. This information may be transmitted to the artificial intelligence (AI) library or data store to compute the kinematic parameters.

Human characteristics may be determined as well. Human characteristics may include body measurements (e.g., height, weight, shoulder size, pelvis size, etc.) to improve 2D and 3D accuracies. To determine the body measurements, user device 304 may request the information (e.g., what is your height, etc.). In some examples, the body measurements may be determined programmatically using high definition photos and computer vision algorithms (e.g., using a vanishing point calculation, using a reference height, etc.). In some examples, a bounding box may be determined around the human user before the human movement is recorded. The system may provide feedback to the human user via user device 304 if bounding box is in the view. If it is not, the feedback may include instructions where to move so that the bounding box is in view (e.g., move left, move right, step backward or forward, etc.).

User device 304 (or biomechanical analytics computer system 306) may update the user interface with a confirmation that user device 304 is ready to record and/or instruction for the user to begin their performance of an action (e.g., jump, swing, juggle, etc.). The user interface may give confirmation (e.g., that the recording was successful) after every performance when the performance is captured (e.g., audio and visual).

In some examples, the user may provide visual or audible information about the action. For example, a user may confirm with hand gesture whether the swing was good, bad, or average. The hand gesture may be captured in an image frame at user device 304 and provided as input to a trained machine learning model to determine the command/action corresponding with the gesture.

In some examples, user device 304 may register the action data based on user confirmation (e.g., the hand gesture is compared with a predetermined movement identifying a confirmation within a threshold value, etc.). In some examples, the registration of the action data may include transmitting the action data to biomechanical analytics computer system 306.

User device 304 may receive one or more interactions from the user. The interactions may select one or more components for tracking, including clicking or tapping on pictures, video, or other representations of an actor or context object, or selecting components or context objects from lists presented to the user. In some examples, the interactions may include selecting components or context objects through natural language requests (e.g., "watch my elbows, wrists, and the club head").

Figure 6:
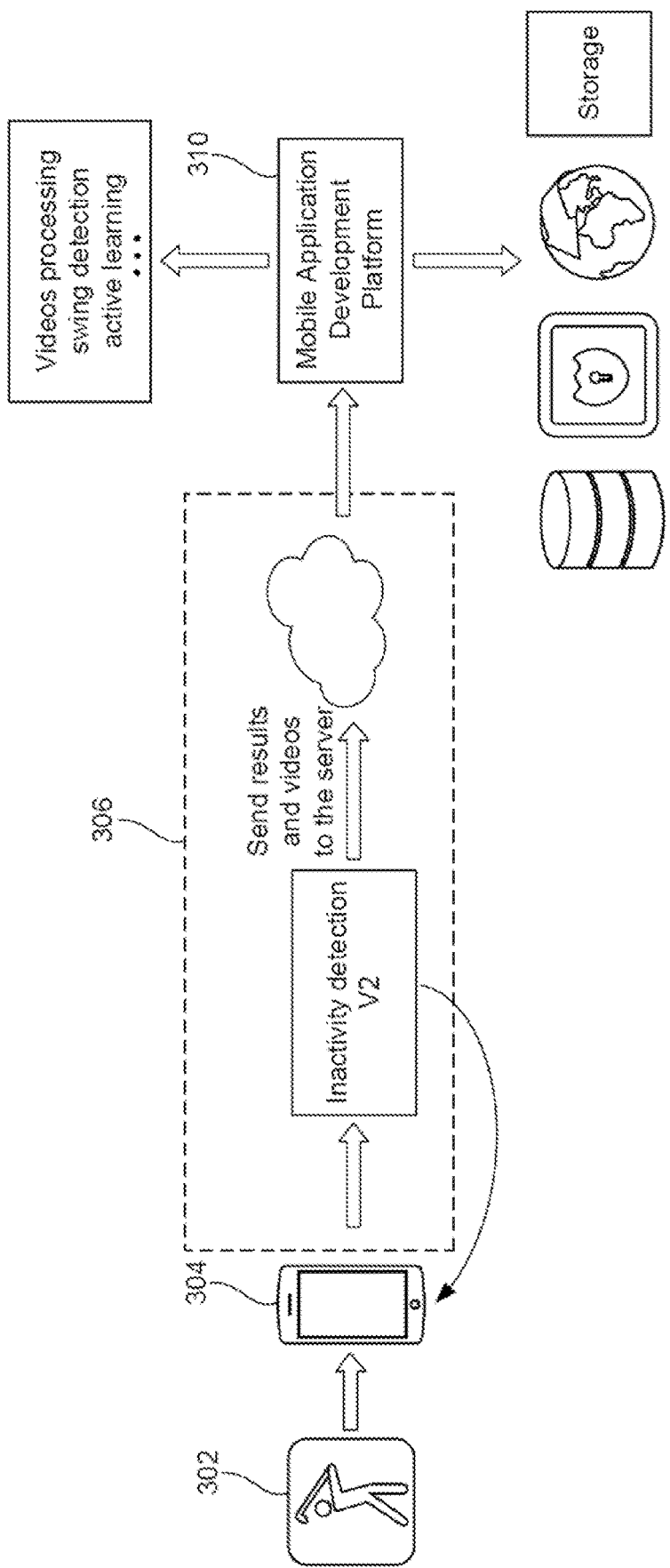
FIG. 6 is an illustrative process for interacting with a user device, in accordance with the embodiments disclosed herein.

In some examples, user continues to perform the action (e.g., swing). After each performance, a user confirmation may be provided to user device 304. The action may be ended when the user moves (e.g., walks, etc.) out the camera scope. User device 304 may stop capturing once user leaves the screen or other inactivity is identified, as illustrated with FIG. 6. In some examples, rather than a live action video, the action may be performed in a recorded or existing video (e.g., from user device data store, from an online data store accessible by a uniform resource location (URL), etc.). The swing analysis may be transmitted to user device 304 when user returns to viewing user device 304.

In some examples, the user may be asked to align the golf ball with a white circle on the screen. This can determine the distance of the camera from the ball. There may also be a white line to help adjust the tilt of the camera to the correct level. Voice (text to speech vs recorded) prompts may guide the user to adjust the camera or move left, right, closer or away until a "ready" textual or audio signal. From that field of view, the camera parameters may automatically be determined, including the zoom setting, shutter speed, and ISO parameters (e.g., the camera sensor's sensitivity to light).

Biomechanical analytics computer system 306 may group selected components into a watch list for subsequent use or analysis. For example, the system may automatically determine a set of components constituting a watch list through comparison of a user's performance of an action to a recording of an example performance. The watch list may be authored through programming and editing tools, such that the watch list can be saved, loaded, built into or imported into applications, selected and activated by users, and the like.

The watch list may be used to record the kinematic parameters (e.g., positions, angles, velocities, etc.) of the components in the watch list during the performance of the action. The analysis of the performance may use the recorded kinematic parameters, for example, by measuring quantities of interest of the performance (e.g. speed of the club head), generating visualizations of the performance (e.g. a graph of club-head-speed vs. time), generating graphical overlays representing aspects of the performance, to be displayed over or along with images, video recordings, or digital renderings of the performance, and/or automatically determining best or worst performances by comparing a kinematic parameter sequence to a reference sequence or other prior sequences.

Information may be provided back to user device 302 based on the results of watch list analysis. For example, the information may include advertisements, coupons, or other commercial opportunities such as purchase recommendations. As an illustration, if analysis of the user's performance shows that a certain kinematic parameter (e.g., a foot position, etc.) moves beyond a desirable range, the advertisement may include golf shoes with cleats for better grip. In another example, the information may include recommendations for corrective actions from analysis of the recorded kinematic parameters. As an illustration, the system may generate a suggestion on how the user should alter their performance to bring their kinematic parameters into better agreement with reference or idealized kinematic parameters for that action (e.g., within a threshold value between the recorded action and the parameters, etc.). In another illustration, the system may observe general performance degradation that indicates the user should rest or get food/water.

Figure 8:
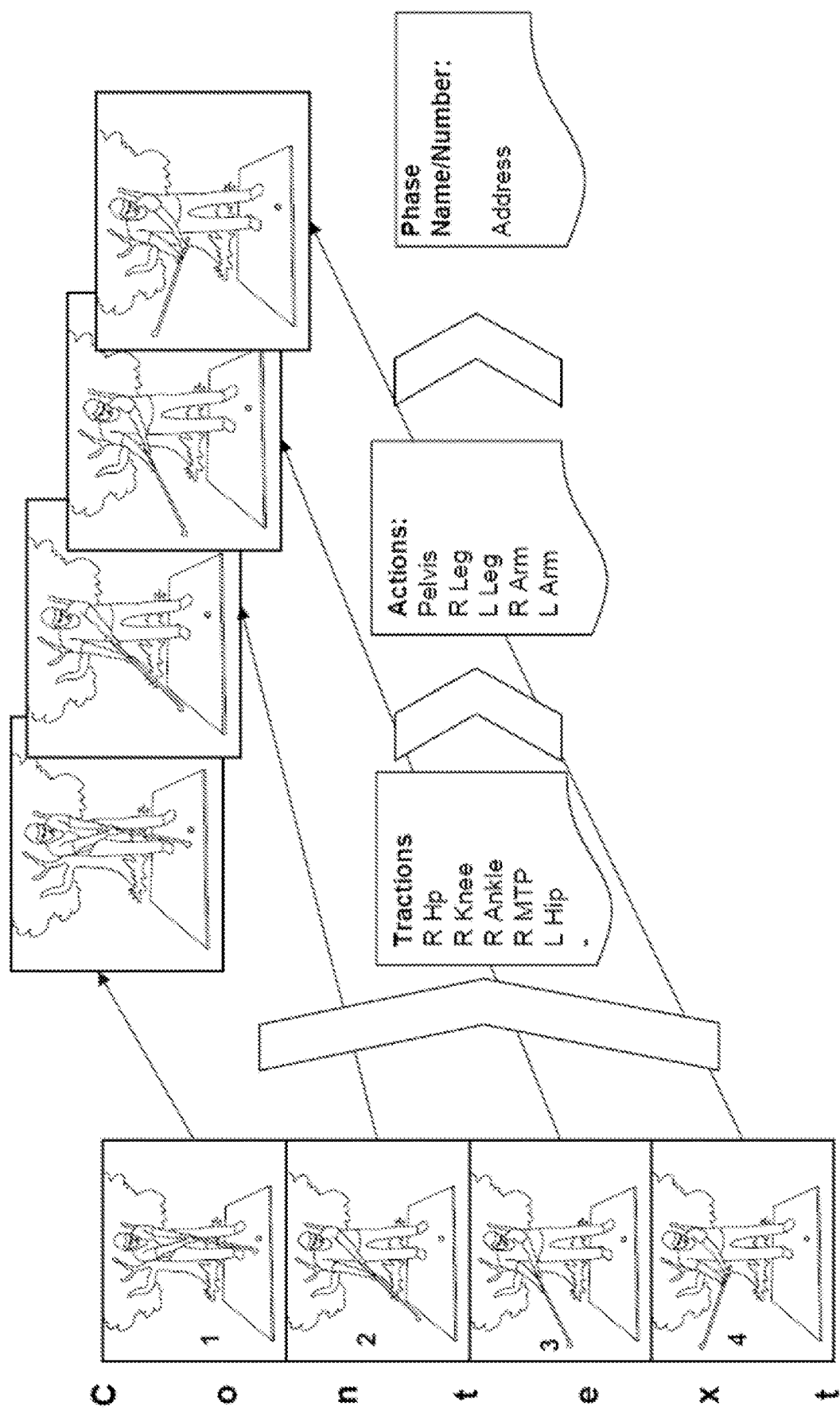
FIG. 8 illustrates a process for determining human movement, in accordance with the embodiments disclosed herein.

The suggestions may correspond with the kinematic parameters (e.g., positions, angles, velocities, etc.) of the components in the watch list during the performance of an action. For example, the positions of the action for golf may include a top of the swing, an end of the swing, tracking movements of the user's wrist, a golf club position at particular swing location, and the like, as illustrated in FIG. 8. The suggestions may offer changes to the positions identified for the domain.

In some examples, the suggestions may correspond with changing inputs to data processing module 108. The suggestions may correspond with adjusting various camera characteristics and camera positions for the image or video data at user device 304 including, but not limited to, angle, tilt, or focal length. In some examples, different camera angles may be suggested based on swing location (e.g., to see the changes at the most visible angle, etc.). In some examples, additional sensors may be recommended to capture data in addition to image date (e.g., magnitude, speed, direction, etc. using a gyroscope).

In some examples, biomechanical analytics computer system 306 may correlate the results of watch list analysis with additional context data to affect what information is presented to the user (e.g., correlating the likely detection of fatigue in the user with GPS information to surface advertisements for nearby restaurants or cafes where the user could rest and obtain food/drink before their next round of golf). Categories of context information can include, for example, historical records from the user's prior performances (e.g., in golf, the results of the user's previous shot, their prior performance on this same hole, etc.), environmental data like geographic location data (e.g., where the user is at the time of the analysis pursuant to presenting information, etc.), nearby objects or terrain features (e.g., in golf, trees, water hazards, sand traps, pin distance/direction/elevation, local topography, other players, golf carts, etc.), type and intensity of ambient or nearby noises, weather conditions (e.g., wind direction, wind speed, temperature, humidity, precipitation, sun angles, cloud cover, etc.), user's physiological state (e.g., heart rate, respiration, temperature, perspiration, etc.), or other information applicable to the action and/or the user's situation. Other categories may include user-generated context, comprising a self-reported mental state, determined information about the user, or potentially arbitrary information (e.g., in golf, "swing thoughts" such as "in this swing, I am focusing on my left knee flexion in the start of the downswing"; or pre-shot routines such as how many steps the user took to step into the shot, wait time before starting the swing, number of practice swings, etc.). Other categories may include domain-specific information in other categories that are context specific. For example, in golf, the par rating for the hole, which is a domain-specific piece of environmental/geographic data, or an opponent's or playing partner's current score on the hole or in the round. The watch lists and/or motion trackers can be pre-authored, created at runtime through a user interface, loaded, saved, etc.

User device 304 may access an analyzed session, human movement, action, or other information generated by biomechanical analytics computer system 306 and present the information to the user interface of user device 304. For example, to find an analyzed session, the user may access a "Swings" tab and default land on the "Sessions" tab. The user may review the list of sessions (e.g., with the most recent session on top, etc.) through a search feature. The search feature may include a filter or sort feature to organize the sessions or other information.

In some examples, user device 304 may access a 3D avatar that can switch between 2D (e.g., image frames, video, etc.) and suggestions on improving actions. For example, the user interface may be updated to show functions of action tips (e.g., "swing genius" on or off), 2D/3D mode, and video play controls. The interface may be updated with a 3D avatar analysis, 2D avatar, point of view (POV), change 2D to 3D, or other information. In some examples, user device 304 may create a watch list by first identifying a reference action in 2D or 3D and then identifying joints or other human movements.

The analyzed information may be provided back to a machine learning model for post analysis training. For example, the user may generate the watchlist item from a previous session stored in a data store or a current action provided within a session. The watchlist item and/or action may be provided to the machine learning model. In another example, the user may set up the camera or other sensor and start recording. When the user is practicing the action and not providing a confirmation, the actions may not be uploaded to biomechanical analytics computer system 306. When the user is practicing the action and providing a confirmation (e.g., thumbs up, etc.), the actions may be uploaded to biomechanical analytics computer system 306. Once analyzed, biomechanical analytics computer system 306 may transmit a summary of the analysis to show progress, areas of improvement, whether the user did well with the watchlist item or not, or other information. After each shot, the user interface may be updated to provide the summary (e.g., watchlist item 1, 2, 3 at 40%, next shot should be 50%, etc.). After a threshold number of actions (e.g., after 5 actions), when the user is not improving a threshold value (e.g., not twisting 5% more, etc.), the system may suggest the user review additional information (e.g., watch an instructional drill video, etc.) or perform particular actions (e.g. do a practice drill).

User device 304 may provide access to historical actions, statistics, and determined information for the user's actions or a different user's actions (e.g., expert user, friend, model action, etc.). The information may be provided through the user interface.

In some examples, user device 304 may provide access to action statistics. The statistics screen may automatically disappear when the user starts swinging. The user may hear the key statistics in a text to speech prompt. This may also signal that the action was successfully captured. The audio prompt may be cut short if the user starts performing the action again. If the user is out of frame in their subsequent actions, user device 304 may use voice prompts to direct them back into the frame. The user may have the option to indicate their satisfaction with the shot with hand signals or voice command after every action. This may be used in the session summary and tied to the user's analytics (e.g., action score and/or quality, watchlist item score, consecutive good performances, etc.).

Mobile application development platform 310 may determine and/or store a user's interactions and session information with biomechanical analytics computer system 306. In some examples, mobile application development platform 310 may determine and/or store raw data like videos, images, environment conditions, and the like. The data may be received by biomechanical analytics computer system 306 data for various analytics reports or other processing.

FIG. 7 is an illustrative human movement, in accordance with the embodiments disclosed herein. In the illustration, a human movement is performed relating to a sport of golf, although any context may be applicable. The human user may be centered in an image frame (e.g., through feedback from the registration and setup process, etc.) and the user device may record one or more image or video frames of the human movement.

In some examples, the user may register with the system. This may include determining one or more objects in the image frame to identify the context/domain of the activity, determining the distance between the user and the camera using a known item measurement (e.g., placing a golf ball between the user's feet and using that measurement to determine measurements for the rest of the body, etc.), or other human characteristics (e.g., questioning the user on their height, weight, shoulder size, etc.).

The video processing may occur at user device 304, biomechanical analytics computer system 306, or a hybrid approach. In the hybrid approach, user device 304 may record the video and biomechanical analytics computer system 306 may process video (e.g., if the network connection is faster than a threshold value to permit streaming media with minimal delay, etc.). Biomechanical analytics computer system 306 may store all generated and raw data, which can be used for improving the system, generating analytics, and providing information to the user about past sessions and actions.

FIG. 8 illustrates a process for determining human movement, in accordance with the embodiments disclosed herein. In the illustration, the image frames are analyzed through the progression of the human movement. A context or domain may be determined through an image analysis process. The image frames may be separated into a set of movements and each movement in the set of movements may be compared to determine which body parts are participating in the human movement.

The image frames may be captured in a predetermined time interval (e.g., every half-second, every 10 milliseconds, etc.). The sensor(s) used to capture the action may be triggered along the time interval. This may include visual characteristics of the image captured by a camera, motion or magnitude values captured by a motion sensor (e.g., to determine speed, direction, etc.), or other values described throughout the disclosure. As illustrated, four images are captured to determine the context of the action, including four different positions of a swing in the activity/domain of golf.

Figure 9:
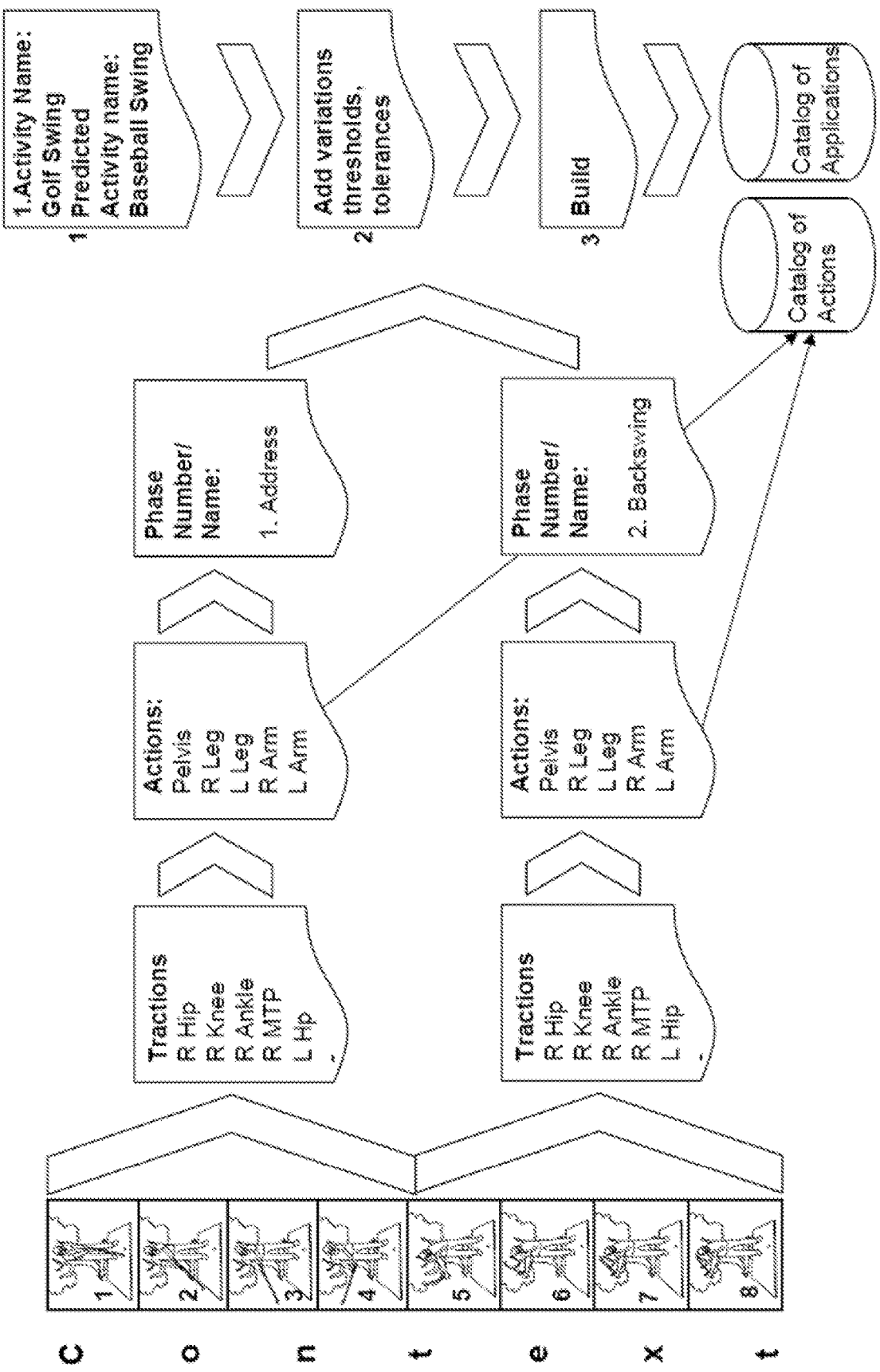
FIG. 9 illustrates a process for determining human movement in a particular context, in accordance with the embodiments disclosed herein.

FIG. 9 illustrates a process for determining human movement in a particular context, in accordance with the embodiments disclosed herein. In the illustration, each movement in the set of movements is compared with a pre-determined human movement stored with biomechanical analytics computer system 306. For example, the system may measure the human movement such as bending at the waist (forward and back), lifting (up and down movement) and sway (side to side movement) to detect multiple joints through 3D pose estimation. From this, biomechanical analytics computer system 306 can automatically generate 3D avatars of the actor from a single-viewpoint recording and detect multiple joints through 3D pose estimation, or the conversion of a 2D pose estimation into a 3D space.

Figure 10:
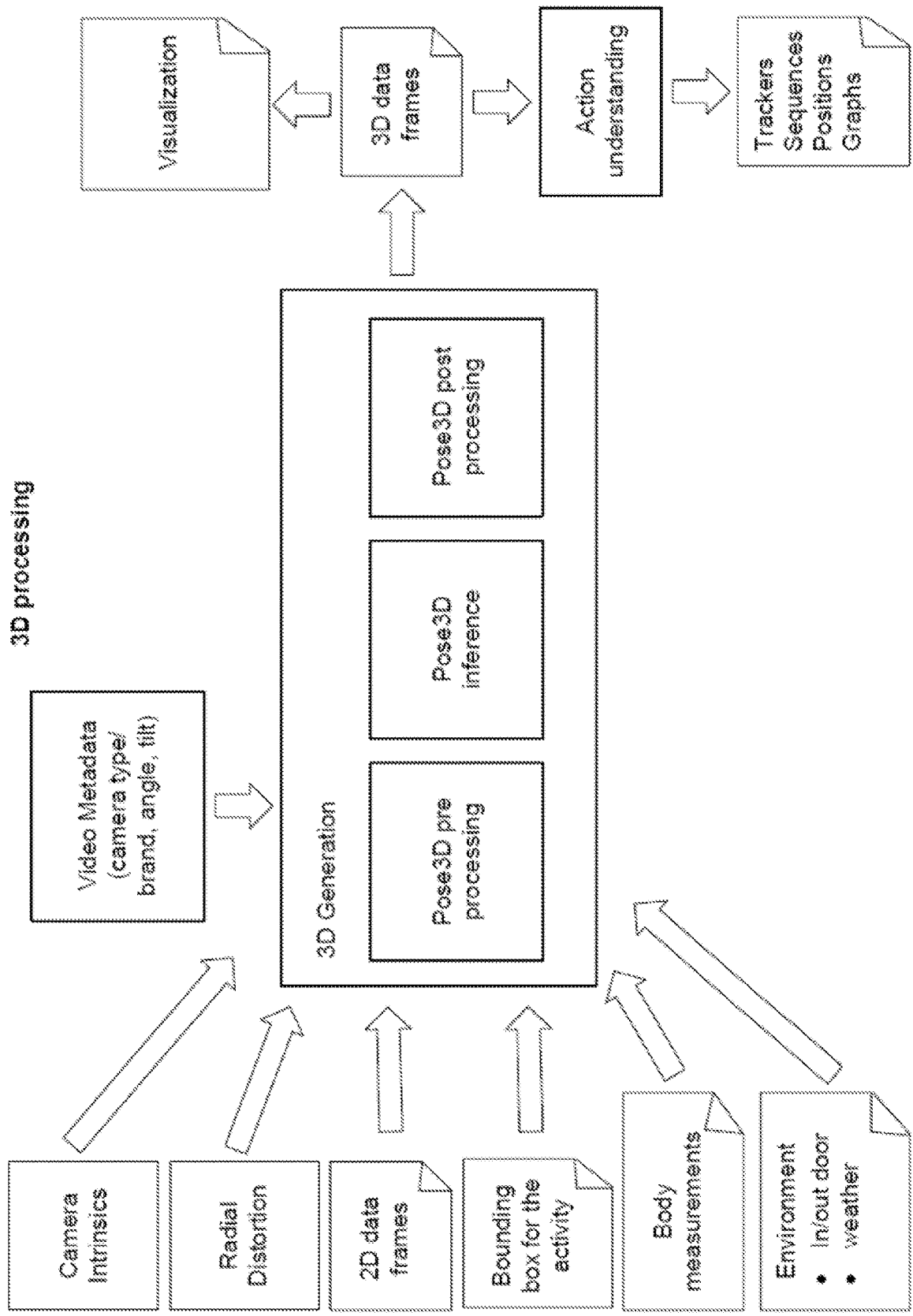
FIG. 10 provides illustrative 3D processing, in accordance with the embodiments disclosed herein.

FIG. 10 provides illustrative 3D processing, in accordance with the embodiments disclosed herein. In the illustration, data points are received from various sources, including video metadata (e.g., camera type, camera brand, angle, tilt, etc.), camera intrinsic details, radial distortion 2D data frames, bounding box for the activity, body measurements, and/or environmental data.

In some examples, the human movement is determined (e.g., golf swing) and various other human movements in a similar context can be compared. The origin of the other human movements can include, for example, various golf videos, the watch lists, context information, and the like. These similar human movements can be compared to generate a 2D post estimation in a 3D space, or a 3D avatar performing a representation of the human movement. In some examples, the kinematic parameter sequences from each analyzed human movement may combine portions of kinematic parameter sequences from selected users to create a hybrid (e.g., tee-shot that corresponds with Tiger Woods from the waist up and Jack Nicklaus from the waist down) or from the same user to determine an average performance for that user (e.g., "Your typical tee shot looks like this").

In some examples, once the context and image frames are processed and analyzed, the activity and/or context may be determined (e.g., golf swing). If the activity can be identified, the user interface at user device 304 may be updated with relevant information. If the activity cannot be identified, further analysis of the activity may be performed.

The 3D generation process may include pre-processing, inference, and/or post-processing. For example, the data pre-processing can include the data cleansing process performed by data processing module 108. Some examples for data pre-processing includes outlier detection, missing value treatments, and removal of the unwanted or noisy data. In some examples, post-processing may comprise real-time 3D rendering to generate the 3D avatar and/or additional effects (e.g., domain object, environment data, etc.).

The 3D generation process may generate one or more 3D data frames. For example, the 3D avatar may be adjusted into a 3D movement that are limited by biomechanical data. Each movement may be stored as a 3D data frame.

In some examples, the 3D avatar movement in 3D data frames can generate a visualization of human movement. For example, a sequence of KP and/or coordinates of the 3D avatar may be provided to an open source software application. The open source software application may generate an animation that the 3D avatar may follow to follow with the sequence of KP and/or coordinates.

In some examples, the 3D avatar movement in 3D data frames can generate an action understanding of human movement. For example, the 3D image frames may be correlated as forming an activity for the domain. The action understanding may correspond with recognizing several individual movements as belonging to one action.

The action understanding may provide input data for motion trackers, sequences, positions, graphs, or other information. In some examples, the identified action may be compared with an ideal action or some other reference.

Figure 11:
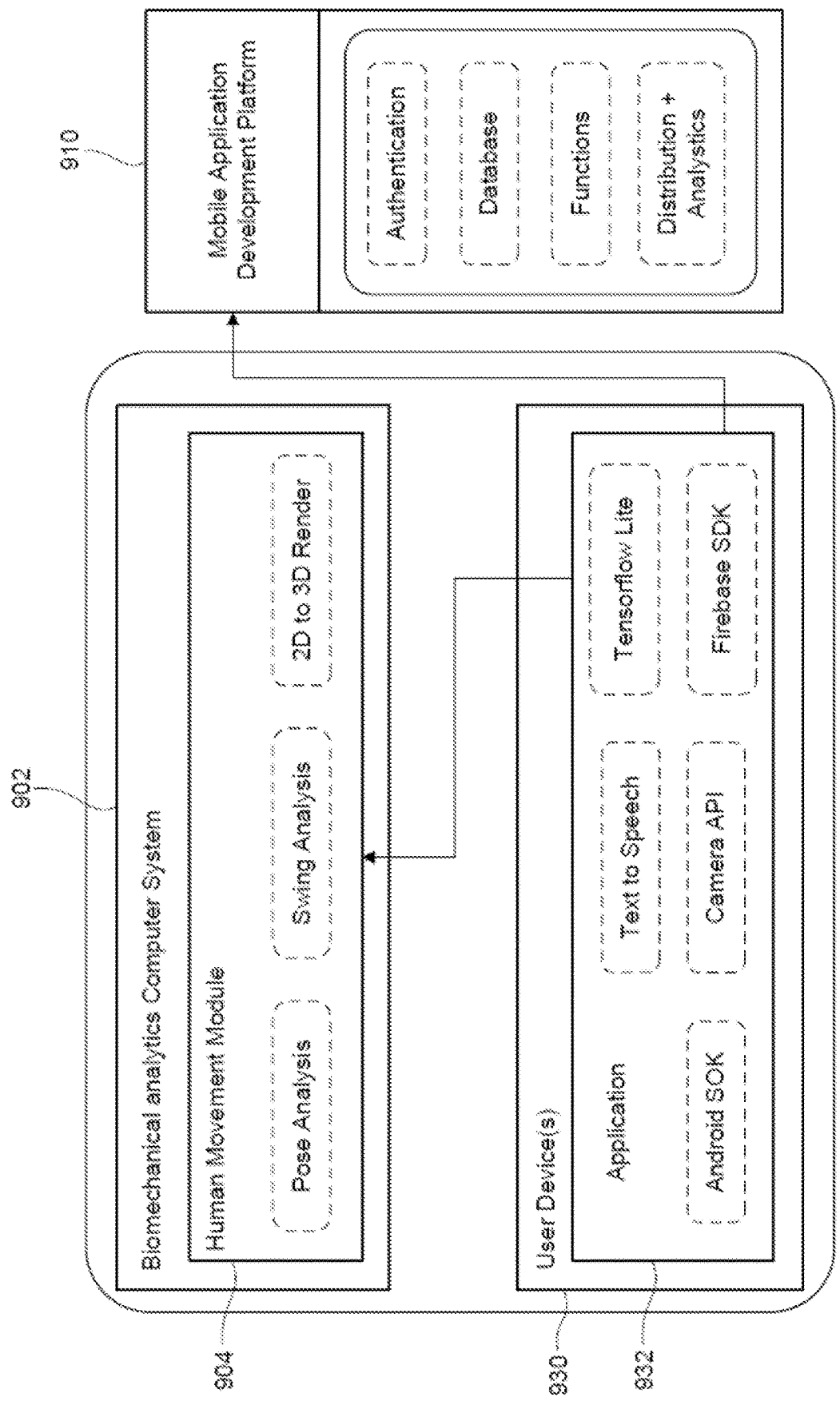
FIG. 11 illustrates a biomechanical analytics computer system, user device, and mobile application development platform, in accordance with the embodiments disclosed herein.

FIG. 11 illustrates a biomechanical analytics computer system, user device, and mobile application development platform, in accordance with the embodiments disclosed herein. In this illustration, biomechanical analytics computer system 902, mobile application development platform 910, and user device(s) 930 may be in communication to analyze and generate 3D avatars using biomechanical analysis. Biomechanical analytics computer system 902 and user device(s) 930 in FIG. 11 may correspond with biomechanical analytics computer system 102 and user device(s) 130 in FIG. 1.

Biomechanical analytics computer system 902 may comprise human movement module 1004. Human movement module 1004 may implement a pose analysis, action (e.g., swing, etc.) analysis, and a 2D to 3D model rendering. These operations may be limited based on biomechanical limitations of the human body, human movement, and object tracking. The pose analysis, action analysis, and a 2D to 3D model rendering may be generated using machine learning and/or computer vision processes.

User device(s) 930 may receive one or more image frames from a human movement using an application 932 installed with the user device. One or more tools may be incorporated with the user devices as well, including text to speech, a data library for numerical computation and machine learning, SDK, and/or APIs to run components described with the human movement module 1004.

Mobile application development platform 910 may comprise cloud resources for storing and/or executing operations. The data structure and/or operations may support biomechanical analytics computer system 902 in a cloud computing environment. For example, mobile application development platform 910 may comprise authentication, one or more databases, machine-readable instructions and/or functions, and distribution or analytics data to perform persistence and storage operations.

Figure 12:
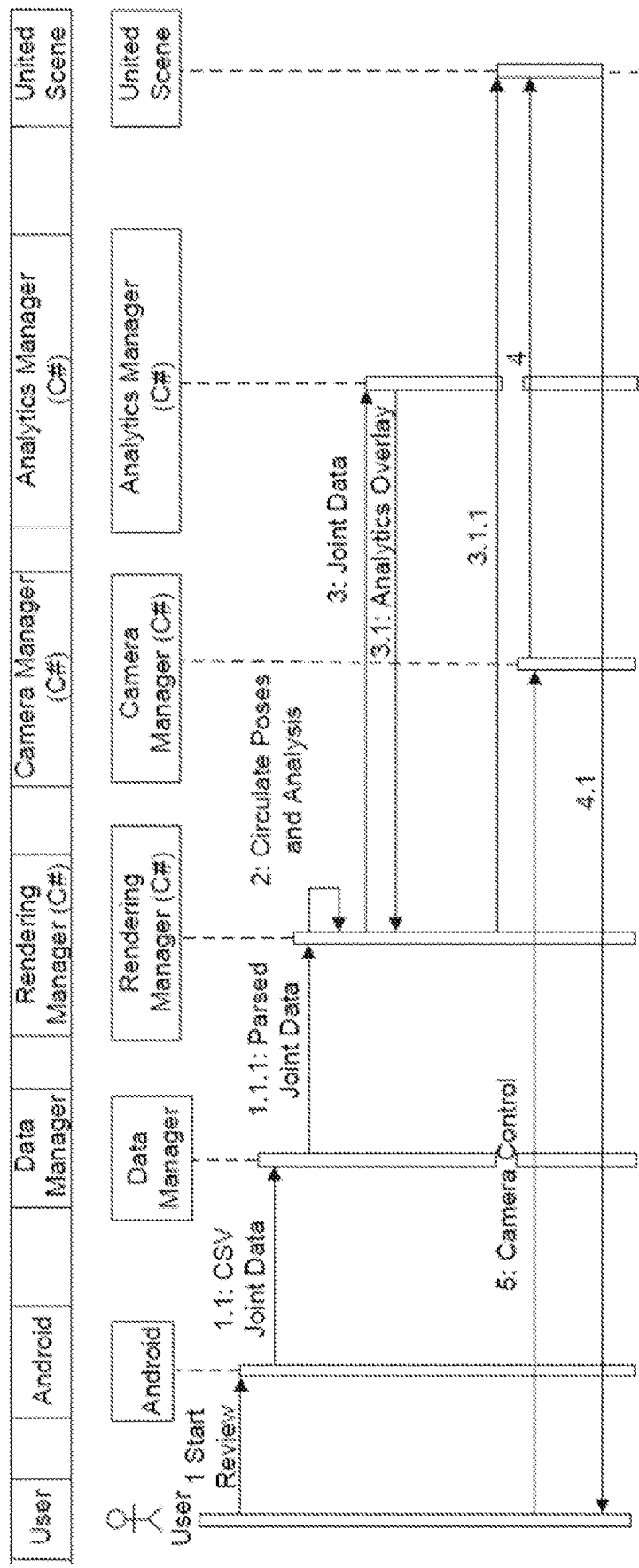
FIG. 12 illustrates receiving a 3D avatar at a user device, in accordance with the embodiments disclosed herein.

FIG. 12 illustrates receiving a 3D avatar at a user device, in accordance with the embodiments disclosed herein.

At block 1, a user may review an application at a user device. The user device may capture one or more images or videos of the user. The image frames may comprise biomechanical values, body parts or joints, or other data corresponding with the user or other characteristics of the image frame. The image frames may be stored at the user device.

At block 1.1, the image frames, biomechanical values, and other data may be transmitted to a data manager. The data may be transferred as a machine-readable file (e.g., comma separated value (CSV), etc.). The data manager may be incorporated with biomechanical analytics computer system 102 (e.g., data processing module 108).

At block 1.1.1, the data may be parsed and/or otherwise cleaned by biomechanical analytics computer system 102. The parsed data may be transmitted to a rendering manager. Rendering manager may be incorporated with biomechanical analytics computer system 102 (e.g., data processing module 108, human movement module 110, etc.).

At block 2, the rendering manager may determine poses or other analysis associated with the motion sequences identified in the image frames. In some examples, the joints used to perform the poses may be determined.

At block 3, the rendering manager may transmit the joint data and/or other pose data to an analytics manager. The analytics manager may determine an overlay corresponding with the joints that perform the poses. The analytics manager may be incorporated with biomechanical analytics computer system 102 (e.g., human movement module 110).

At block 3.1, the overlay may be transmitted from the analytics manager back to the rendering manager. The rendering manager may generate a time-synchronized 3D avatar rendering and overlay the 3D avatar with additional data. The additional data may include, for example, a video recording of a user's performance, to allow the user to compare current performance with past performances (e.g., "show this swing versus my best swing"), a video recording of a reference performance (e.g., "show my best swing versus a specific pro golfer"), and/or automatically detecting and highlighting differences between two performances.

At block 3.1.1, the rendering and overlay may be transmitted by the rendering manager to a unity scene device. The unity scene device may combine the multiple layers (e.g., avatar, overlay, etc.) with newly recorded video (e.g., blocks 4 and 5, etc.).

At block 4.1, the rendering, overlay, and/or additional image frames may be provided back to the user via the user device.

Figure 13:
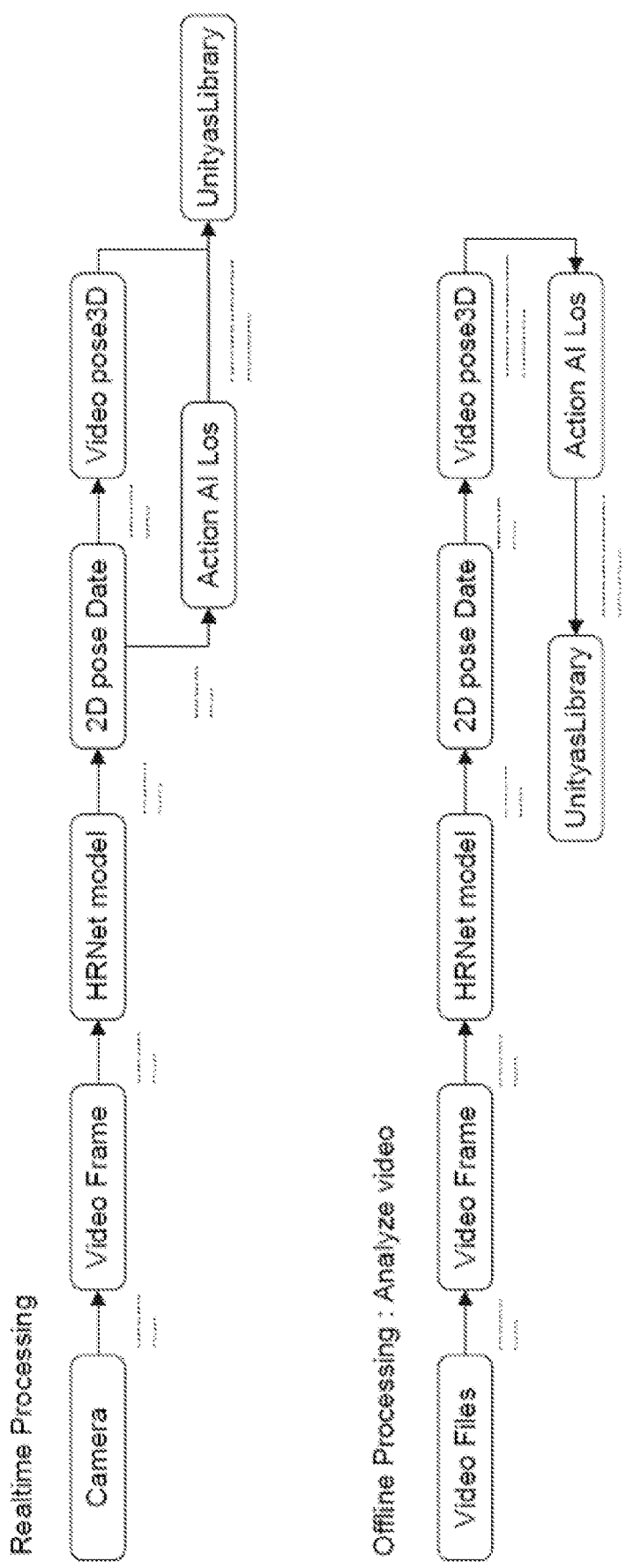
FIG. 13 illustrates generating a 3D avatar at a biomechanical analytics computer system, in accordance with the embodiments disclosed herein.

FIG. 13 illustrates generating a 3D avatar at a biomechanical analytics computer system, in accordance with the embodiments disclosed herein.

In real-time processing, the camera or other sensor may generate image or video frames of the human movement. The captured image or video frames may be stored in a 2D format and/or compared with an library of predetermined poses (e.g., HR-net*, open pose, Google pose net, etc.). The output of the comparison may determine 2D pose data and/or context information associated with the pose. The information may generate one or more image frames that correspond to motion performed by a 3D avatar.

In offline processing, the image or video frames may be received in a 2D format (e.g., from a data store, from a camera or sensor, etc.) and/or compared with an library of predetermined poses (e.g., HR-net*, open pose, Google pose net, etc.). The output of the comparison may determine 2D pose data and/or context information associated with the pose. The information may generate one or more image frames that correspond to motion performed by a 3D avatar.

FIG. 14 illustrates a data store storing watch list data for a 3D avatar, in accordance with the embodiments disclosed herein. The data store may include watch list information, including a watch list identifier (ID), user ID, score, date, point of view, zoom level, and one or more trackers.

FIG. 15 illustrates a data store storing tracker data for a 3D avatar, in accordance with the embodiments disclosed herein. The data store may include tracker information, including a tracker identifier (ID), tracker name, category, description to define the tracker, tracker type (e.g., dynamic or static), and/or measurement unit.

FIG. 16 illustrates a data store storing watch list and tracker data for determining 3D movements by the biomechanical analytics computer system, in accordance with the embodiments disclosed herein. The data store may correlate one or more watch list IDs with one or more tracker IDs. A minimum value, maximum value, and position may also be stored corresponding with the one or more watch list IDs and one or more tracker IDs.

Figure 17:
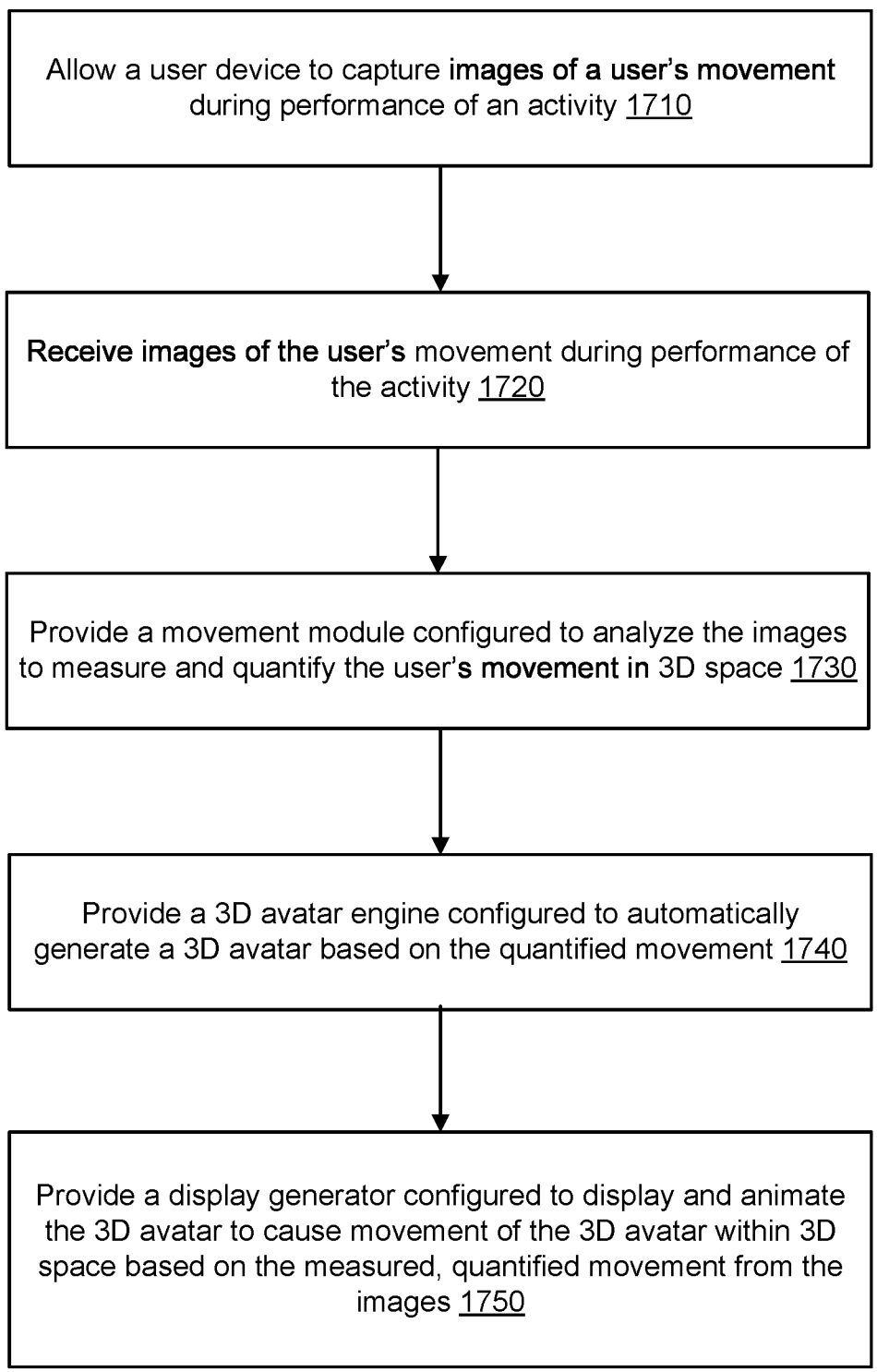
FIG. 17 illustrates a process or generating a 3D avatar, in accordance with the embodiments disclosed herein.

FIG. 17 illustrates a process or generating a 3D avatar, in accordance with the embodiments disclosed herein. The method may be implemented by machine readable instructions executed by processor 104 of biomechanical analytics computer system 102 of FIG. 1.

At 1710, a user device may be allowed to capture images of a user's movement during performance of an activity. The images of parts of the body may correspond with a selection of a domain of the activity, as described herein.

At 1720, one or more images of a user's movement during performance of an activity may be received.

At 1730, a movement module configured to analyze the images to measure and quantify the user's movement in three-dimensional space may be provided. In some examples, the analysis of the images may be limited to kinematic parameters associated with the domain of the activity.

At 1740, a 3D avatar engine configured to automatically generate a 3D avatar based on the quantified movement may be provided.

At 1750, a display generator configured to display and animate the 3D avatar to cause movement of the 3D avatar within a three-dimensional space based on the measured, quantified movement from the images may be provided.

In some examples, the system may comprise a watch list engine configured to enable creation of one or more watch lists comprising a list of measurable attributes of a performance for which the system is configured to monitor during analysis of the images.

In some examples, the system may comprise a watch list engine configured to enable creation of one or more domain specific watch lists.

In some examples system may comprise a watch list engine configured to enable creation of one or more domain specific watch lists and specification of a weighting of kinematic parameters and sequences for analysis of images of performances within the domain, wherein the kinematic parameters correspond with measurable attributes of a performance.

In some examples, the system is configured to enable creation of one or more motion trackers comprising specific kinematic parameters and sequences of motions.

In some examples, the system is configured to enable creation of one or more domain specific motion trackers.

In some examples, the system is configured to enable creation of one or more motion trackers for tracking the movement of domain-specific kinematic parameters and sequences of motions.

In some examples, the system is configured to enable creation of one or more motion trackers comprising specific kinematic parameters and sequences of motions, the kinematic parameters comprising position, velocity, acceleration, and/or higher-order derivatives of the position with respect to time.

In some examples, the system comprises the 3D avatar engine is configured to apply recorded 3D motion data from a user to an avatar.

In some examples, the 3D avatar engine is configured to model a first user's body as an articulated structure including a set of human skeletal components connected via joints and a measured spatial relationship among the user's skeletal components and animate the model along three-dimensional space based on the measured movement of the user along three-dimensional space.

In some examples, the 3D avatar engine is configured to customize a model of a user's body based on a domain of the activity.

In some examples, the processor is further configured to compare the measured movements in a user's performance of an activity to a stored set of target measured movements of a reference performance of the activity.

In some examples, the processor is further configured to compare the measured movements in a user's performance of an activity to a stored set of target measured movements of a reference performance of the activity; and the 3D avatar engine is configured to display an overlay of an avatar based on the user's performance of the activity and a reference avatar based on the reference performance of the activity.

In some examples, the processor is further configured to compare the measured movements in a first user's performance of an activity to a stored set of a measured movements of a second user's performance of the activity.

In some examples, the processor is further configured to compare the measured movements in a first user's performance of an activity to a stored set of a measured movements of a second user's performance of the activity; and the 3D avatar engine is configured to display an overlay of an avatar based on the first user's performance of the activity and an avatar based on the second user's performance of the activity.

In some examples, the processor is further configured to compare the measured movements in a user's first performance of an activity to a stored set of target measured movements of the user's second performance of the activity.

In some examples, the processor is further configured to compare the measured movements in a user's first performance of an activity to a stored set of target measured movements of the user's second performance of the activity; and the 3D avatar engine is configured to display an overlay of an avatar based on the user's first performance of the activity and an avatar based on the user's second performance of the activity.

In some examples, the display generator is configured to enable a user to playback the user's performances of an activity and control the perspective from which the avatar is displayed.

In some examples, the movement module is configured to identify objects other than the user in the images, track kinematic parameters of the objects in the images, and generate context data based on the tracked kinematic parameters of the objects.

Figure 18:
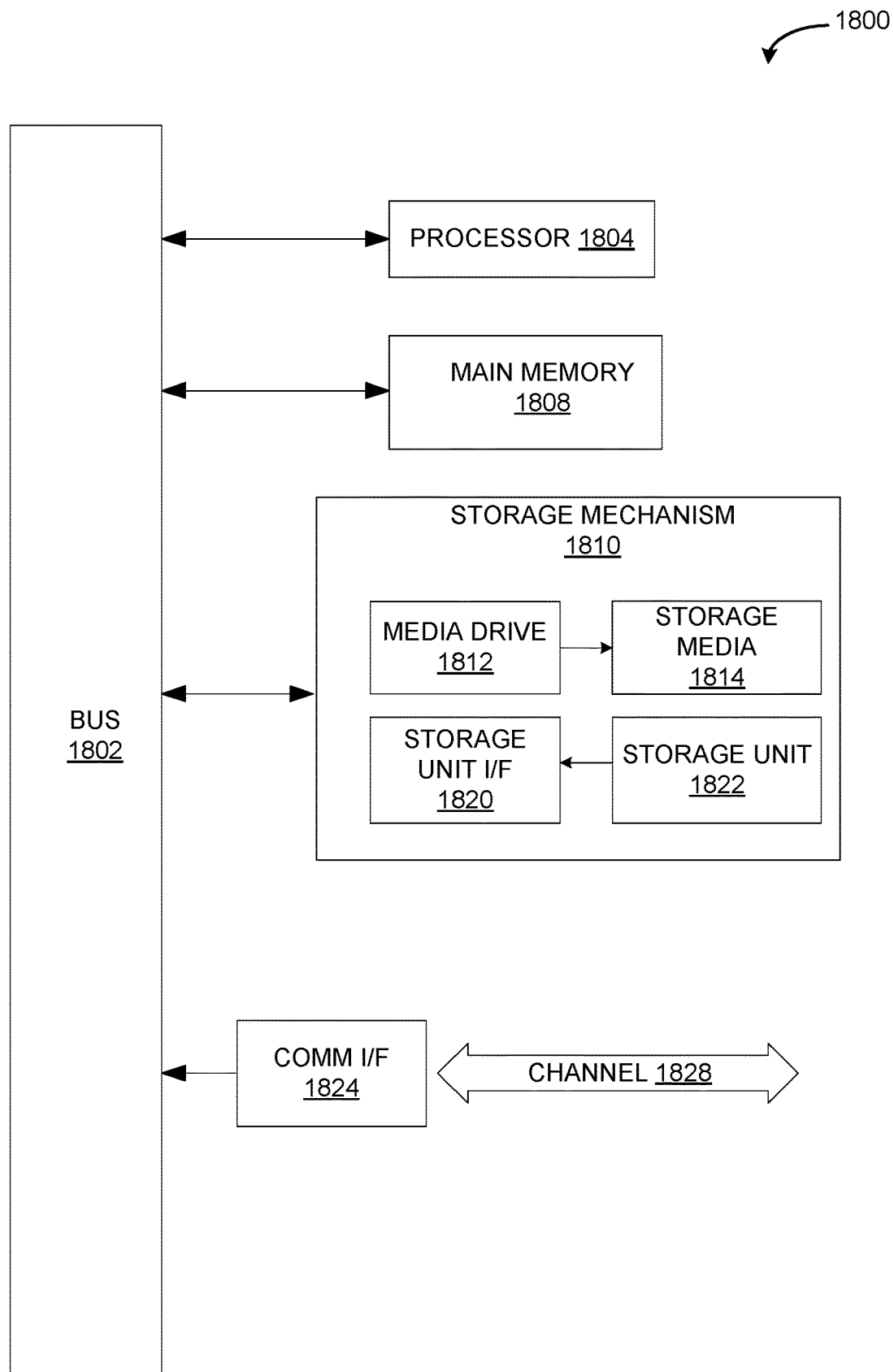
FIG. 18 is an example of a computing system that may be used in implementing various features of embodiments of the disclosed technology.

In some examples, the movement module is configured to identify objects other than the user in the images, track and measure kinematic parameters of the objects in the images and the display generator is configured to display the 3D avatar relative to the objects based on the measured movements of the user in the images and the kinematic parameters of the objects in the images.

Where components, logical circuits, or engines of the technology are implemented in whole or in part using software, in one embodiment, these software elements can be implemented to operate with a computing or logical circuit capable of carrying out the functionality described with respect thereto. One such example logical circuit is shown in FIG. 18. Various embodiments are described in terms of this example logical circuit 1800. After reading this description, it will become apparent to a person skilled in the relevant art how to implement the technology using other logical circuits or architectures.

Referring now to FIG. 18, computing system 1800 may represent, for example, computing or processing capabilities found within desktop, laptop, and notebook computers; hand-held computing devices (PDA's, smart phones, cell phones, palmtops, etc.); mainframes, supercomputers, workstations, or servers; or any other type of special-purpose or general-purpose computing devices as may be desirable or appropriate for a given application or environment. Logical circuit 1800 might also represent computing capabilities embedded within or otherwise available to a given device. For example, a logical circuit might be found in other electronic devices such as, for example, digital cameras, navigation systems, cellular telephones, portable computing devices, modems, routers, WAPs, terminals and other electronic devices that might include some form of processing capability.

Computing system 1800 might include, for example, one or more processors, controllers, control engines, or other processing devices, such as a processor 1804. Processor 1804 might be implemented using a general-purpose or special-purpose processing engine such as, for example, a microprocessor, controller, or other control logic. In the illustrated example, processor 1804 is connected to a bus 1802, although any communication medium can be used to facilitate interaction with other components of logical circuit 1800 or to communicate externally.

Computing system 1800 might also include one or more memory engines, simply referred to herein as main memory 1808. For example, preferably random-access memory (RAM) or other dynamic memory, might be used for storing information and instructions to be executed by processor 1804. Main memory 1808 might also be used for storing temporary variables or other intermediate information during execution of instructions to be executed by processor 1804. Logical circuit 1800 might likewise include a read only memory ("ROM") or other static storage device coupled to bus 1802 for storing static information and instructions for processor 1804.

The computing system 1800 might also include one or more various forms of information storage mechanism 1810, which might include, for example, a media drive 1812 and a storage unit interface 1820. The media drive 1812 might include a drive or other mechanism to support fixed or removable storage media 1814. For example, a hard disk drive, a floppy disk drive, a magnetic tape drive, an optical disk drive, a CD or DVD drive (R or RW), or other removable or fixed media drive might be provided. Accordingly, storage media 1814 might include, for example, a hard disk, a floppy disk, magnetic tape, cartridge, optical disk, a CD or DVD, or other fixed or removable medium that is read by, written to, or accessed by media drive 1812. As these examples illustrate, the storage media 1814 can include a computer usable storage medium having stored therein computer software or data.

In alternative embodiments, information storage mechanism 1840 might include other similar instrumentalities for allowing computer programs or other instructions or data to be loaded into logical circuit 1800. Such instrumentalities might include, for example, a fixed or removable storage unit 1822 and an interface 1820. Examples of such storage units 1822 and interfaces 1820 can include a program cartridge and cartridge interface, a removable memory (for example, a flash memory or other removable memory engine) and memory slot, a PCMCIA slot and card, and other fixed or removable storage units 1822 and interfaces 1820 that allow software and data to be transferred from the storage unit 1822 to logical circuit 1800.

Logical circuit 1800 might also include a communications interface 1824. Communications interface 1824 might be used to allow software and data to be transferred between logical circuit 1800 and external devices. Examples of communications interface 1824 might include a modem or soft modem, a network interface (such as an Ethernet, network interface card, WiMedia, IEEE 802.XX or other interface), a communications port (such as for example, a USB port, IR port, RS232 port, Bluetooth® interface, or other port), or other communications interface. Software and data transferred via communications interface 1824 might typically be carried on signals, which can be electronic, electromagnetic (which includes optical) or other signals capable of being exchanged by a given communications interface 1824. These signals might be provided to communications interface 1824 via a channel 1828. This channel 1828 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1808, storage unit 1820, media 1814, and channel 1828. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the logical circuit 1800 to perform features or functions of the disclosed technology as discussed herein.

Although FIG. 18 depicts a computer network, it is understood that the disclosure is not limited to operation with a computer network, but rather, the disclosure may be practiced in any suitable electronic device. Accordingly, the computer network depicted in FIG. 18 is for illustrative purposes only and thus is not meant to limit the disclosure in any respect.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical, or physical partitioning and configurations can be implemented to implement the desired features of the technology disclosed herein. Also, a multitude of different constituent engine names other than those depicted herein can be applied to the various partitions.

Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "engine" does not imply that the components or functionality described or claimed as part of the engine are all configured in a common package. Indeed, any or all of the various components of an engine, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system configured for applying biomechanical analysis to images of a user's body movement during performance of an activity by the user to generate computer-generated 3D avatars or instructions for the movement of robots, the system comprising:
   one or more hardware processors configured by machine-readable instructions to:
   present a user interface for user selection of a domain of the activity;
   receive a selection of the domain from an administrative user or other user via the user interface;
   execute a watch list engine configured to enable creation of one or more domain specific watch lists, wherein each domain specific watch list comprises a list of measurable attributes of the performance of the activity that are weighted in accordance with the selected domain;
   determine a first set of activity-specific kinematic parameters based on the selected domain;
   receive, from a single-viewpoint image capture device, the images of the user's body movement during performance of the activity by the user;
   execute a movement module configured to analyze the images of the user's body movement during performance of the activity by the user to measure and quantify the first set of activity-specific kinematic parameters of the user's body movement in three-dimensional space;
   execute a 3D avatar engine configured to automatically generate a 3D avatar of the user performing the activity based on the measured and quantified activity-specific kinematic parameters of the user's body movement;
   execute a display generator configured to display and animate: i) the 3D avatar of the user's body movement based on the measured, quantified movement of the activity-specific kinematic parameters; and ii) a second 3D avatar based on kinematic parameters from a reference video of performance of an action to visually represent differences between the user's body movement and those in the reference video; and
   wherein the processor is further configured to compare the measured body movements in the user's performance of the activity to a stored set of measured movements.

2. The system of claim 1, wherein the system is further configured to enable the administrative user or other user to define a domain and one or more motion trackers comprising domain specific kinematic parameters and/or sequences of motion to be monitored during a performance of an action.

3. The system of claim 1, wherein the system is further configured to enable the administrative user or other user to define kinematic parameters or trackers associated with an existing domain, wherein the kinematic parameters or trackers identifies skeletal points in a human body.

4. The system of claim 1, wherein the watch list engine is configured to enable creation of one or more watch lists comprising a list of measurable attributes of a performance for which the system is configured to monitor during analysis of the images.

5. The system of claim 1, wherein the watch list engine is configured to enable creation of one or more domain specific watch lists.

6. The system of claim 1, wherein the watch list engine is configured to enable creation of one or more domain specific watch lists and specification of a weighting of kinematic parameters and sequences for analysis of images of performances within the domain, wherein the kinematic parameters correspond with measurable attributes of a performance,
wherein the kinematic parameters associated with the domain of the activity are weighted in accordance with their relevancy to the domain.

7. The system of claim 1, configured to enable creation of one or more motion trackers comprising domain specific kinematic parameters or sequences of motions to be monitored during a performance of an action; and
the watch list engine is configured to enable creation of one or more domain specific watch lists and specification of a weighting of kinematic parameters and sequences for analysis of the images of performances within the domain, wherein the kinematic parameters correspond with measurable attributes of a performance and the kinematic parameters associated with the domain of the activity are weighted in accordance with their relevancy to the domain.

8. The system of claim 1, configured to enable creation of one or more domain specific motion trackers, wherein the system is further configured to:
receive a selection of an actor's body parts from the user interface;
determine the domain related to the selection; and
store the actor's body parts that correspond with the creation of the one or more domain specific motion trackers.

9. The system of claim 1, configured to enable creation of one or more motion trackers for tracking the movement of domain-specific kinematic parameters and sequences of motions, wherein the system is further configured to:
determine the measured values from the one or more motion trackers from the images of the user's body movement; and
determine a derivative value of the measured values from the one or more motion trackers.

10. The system of claim 1, configured to enable creation of one or more motion trackers comprising specific kinematic parameters and sequences of motions, the kinematic parameters comprising position, velocity, acceleration, and/or higher-order derivatives of the position with respect to time.

11. The system of claim 1, wherein the 3D avatar engine is configured to apply recorded 3D motion data from the user's body movement during performance of an activity to an avatar.

12. The system of claim 1, wherein the 3D avatar engine is configured to model a first user's body as an articulated structure including a set of human skeletal components connected via joints and a measured spatial relationship among the user's skeletal components and animate the model along three-dimensional space based on the measured body movements in the user's performance of the activity.

13. The system of claim 1, wherein the 3D avatar engine is configured to customize a model of a user's body based on the selected domain.

14. The system of claim 1, wherein the processor is further configured to compare the measured movements in a user's performance of an activity to a stored set of target measured movements of a reference performance of the activity.

15. The system of claim 1, wherein the processor is further configured to compare the measured movements in a user's performance of an activity to a stored set of target measured movements of a reference performance of the activity; and the 3D avatar engine is configured to display an overlay of an avatar based on the user's performance of the activity and a reference avatar based on the reference performance of the activity.

16. The system of claim 1, wherein the processor is further configured to compare the measured movements in a first user's performance of an activity to a stored set of a measured movements of a second user's performance of the activity.

17. The system of claim 1, wherein the processor is further configured to compare the measured movements in a first user's performance of an activity to a stored set of a measured movements of a second user's performance of the activity; and the 3D avatar engine is configured to display an overlay of an avatar based on the first user's performance of the activity and an avatar based on the second user's performance of the activity.

18. The system of claim 1, wherein the processor is further configured to compare the measured movements in a user's first performance of an activity to a stored set of target measured movements of the user's second performance of the activity.

19. The system of claim 1, wherein the processor is further configured to compare the measured movements in a user's first performance of an activity to a stored set of target measured movements of the user's second performance of the activity; and the 3D avatar engine is configured to display an overlay of an avatar based on the user's first performance of the activity and an avatar based on the user's second performance of the activity.

20. The system of claim 1, wherein the display generator is configured to enable a user to playback the user's performances of an activity and control a perspective from which the avatar is displayed.

21. The system of claim 1, wherein the movement module is configured to identify objects other than the user in the images, track kinematic parameters of the objects in the images, and generate context data based on the tracked kinematic parameters of the objects.

22. The system of claim 1, wherein the movement module is configured to identify objects other than the user in the images, track and measure kinematic parameters of the objects in the images and the display generator is configured to display the 3D avatar relative to the objects based on the measured movements of the user in the images and the kinematic parameters of the objects in the images.

23. The system of claim 1, wherein the display generator is further configured to display the second 3D avatar that performs the activity based on movements of a coach user and the 3D avatar that performs the activity based on movements of a student user.

24. The system of claim 1, wherein the display generator is further configured to display the 3D avatar and the second 3D avatar in a virtual reality environment.

25. The system of claim 1, wherein the display generator is further configured to display the 3D avatar and the second 3D avatar as competing avatars in a physical or virtual reality environment.

26. The system of claim 1, wherein the processor is further configured to:
 select corresponding points on a body that correspond with the selected domain.

* * * * *